United States Patent [19]
Ballou et al.

[11] Patent Number: 4,811,240
[45] Date of Patent: Mar. 7, 1989

[54] SYSTEM FOR CREATING AND CONTROLLING INTERACTIVE GRAPHIC DISPLAY SCREENS

[75] Inventors: Richard Ballou, Lake Worth; Stanley M. Belyeu, Boca Raton; Joseph A. Boscove, Highland Beach; Hobart L. Kurtz, Boca Raton; Peter Langer, Coral Springs; Andrew B. McNeill, Deerfield Beach; Bernard M. Reid, Coral Springs; Herman Rodriguez, Live Oak, all of Fla.

[73] Assignee: International Business Machines Corporation, Armonk, N.Y.

[21] Appl. No.: 945,431

[22] Filed: Dec. 22, 1986

[51] Int. Cl.[4] .............................................. G06F 15/64
[52] U.S. Cl. .................................... 364/518; 340/747; 364/521; 364/424.01
[58] Field of Search ............... 364/518, 521, 424, 425; 340/747, 720, 718, 799

[56] References Cited

U.S. PATENT DOCUMENTS 4,464,933  8/1984  Santis ............................ 73/432 AD
4,627,015 12/1986  Stephens ............................ 364/900

OTHER PUBLICATIONS

Copies, set of seven (7) Photographs-Concept Car No. 1.
Copies, set of five (5) Photographs—Concept Car No. 2.
Article: "A Slow Start in a Cold Market", C. W. Beardsley, Automotive Electronics, IEEE Spectrum, Sep. 1972, pp. 22-31.
Article: "The Use of Microprocessors as Automobile On-Board Controllers", R. H. Temple et al, Ford Motor Company, Computer, Aug. 1974, pp. 33-36.
Article: "Electronic Display Systems in the Automobile", M. U. Trenne et al, SAE Special Pubs #393 for Meeting Feb. 24-28, 1975, Paper #750365, pp. 101-107.
Article: "Evolving Microprocessors Which Better Meet the Needs of Automotive Electronics" J. Marley, Proceedings of the IEEE, vol. 66, No. 2, Feb. 1978, pp. 142-150.
Article: "Evaluating Pictographic Symbols: An Automotive Appliction" P. Green et al, Human Factors, vol. 20, No. 1, Feb. 1978, pp. 103-114.
Article: "Simplification of System Inputs and Outputs for MPU Control Units" J. Marley, Society of Automotive Engineers, Technical Paper Series, No. 780123, Feb. 27-Mar. 3, 1978.
Article: "Electronics in the Driving Seat" C. Weinstein, Electronics and Power, vol. 24, No. 4, Apr. 1978, pp. 269-272.
Article: "Developments in Automotive Electronics" M. H. Westbrook, Automotive Engineer, Aug./Sep. 1979, pp. 19-23.
Article: "Automobile Electronics for 1980" G. Flynn, General Motors Product Engineering, Sep. 1979, pp. 69-71.
Article: "Displays for Driver Instrumentation: Today and a Look Toward Tomorrow" R. A. Young et al, IEEE Conf. Publ. N181 Int'l Conf. on Automobile Electronics, London, England, Oct. 20-Nov. 2, 1979. Publ. 1979, pp. 293-297.
Article: "Integrated Timer Controller of Automotive Electrical System" A. Ueda et al, IEE Second Int'l Conf. on Automotive Electronics, Oct. 29-Nov. 2, 1979, London, England, pp. 49-53.

(List continued on next page.)

Primary Examiner—Gary V. Harkcom
Assistant Examiner—Randy W. Lacasse
Attorney, Agent, or Firm—D. Kendall Cooper

[57] ABSTRACT

A Graphic Development Instrument System (GDIS) provides a method and capability to design, create and update display screens, including static elements (never change) and dynamic elements (change responsive to stimuli) and is able to include any controller function, without rewriting or modifyng the software. The GDIS enables a screen designer to create EPROMS for those screens for different for example vehicles or models.

5 Claims, 25 Drawing Sheets

OTHER PUBLICATIONS

Article: "On Board Control and Monitoring Systems of Automotive Vehicles" E. Zuckmantel, IEEE Second Int'l Conf. on Automotive Electronics, London, Oct. 29–Nov. 2, 1979, pp. 253–257.

Article: "Automotive 'Signalbus' Multiplex Wiring System" R. R. Foerste, IEE Second Int'l. Conf. on Automotive Electronics, London, Oct. 29–Nov. 2, 1979, pp. 263–267.

Article: "A Multiplexed Wiring System for Cars and Its Electronics" J. R. Massaoubre et al., IEE Second Int'l. Conf. on Automotive Electronics, Oct. 29–Nov. 2, 1979, pp. 268–272.

Article: "Electronic Multiplexing for Vehicles" M. J. Hampshire et al, IEEE Second Int'l. Conf. on Automotive Electronics, Oct. 20–Nov. 2, 1979, pp. 273–277.

Article: "Optical Multiplex Systems for Vehicles" Wesley R. Rogers, SPIE vol. 224 Fiber Optics for Communications and Control 1980, (General Motors Corporation USA).

Article: "A Dedicated Single-Chip Microcomputer for Automotive Dashboard Applications" R. Muller, Society of Automotive Engineers, Inc., Technical Paper Series No. 810307, Feb. 23–27, 1981, pp. 97–100.

Article: "An Innovative Approach in Designing An Electronic Instrument Cluster" F. O. Miesterfeld, Society of Automotive Engineers, Congress and Exposition, Detroit, MI, Technical Paper Series 810308, Feb. 23–27, 1 981, pp. 101–106.

Article: "Multiprocessor Implementation of the Logic Function of a Multiplexed Wiring System for Automotives" N.C.G.N. Preston et al, IEE Proc., vol. 129, Pt. E, No. 6, Nov. 1982, pp. 223–228.

Article: "Microprocessor Controls LCD Instrument Cluster", Society of Automotive Engineers, Inc., 1983, pp. 37–41.

Article: "Microcomputer-Controlled Liquid Crystal Display for Automobiles" K. Horikiri et al, IEEE Transactions on Industrial Electronics, vol. IE-30, No. 2, May 1983, pp. 138–142.

Article: "Touch Sensitive Displays for Operation and Control" M. Menkin et al, Electronic Engineering, Sep. 1983, pp. 177–180.

Article: "Trends in the Development of Vehicle Instruments" W. H. Hucho, Int'l. Journal of Vehicle Design, vol. 5, No. 3, pp. 291–304.

Article: "Automotive Electronics Shift Into Overdrive" E. L. Keller, Electronics Special Report, Jan. 26, 1984, 101–110.

Article: "Sophisticated Electronics Look Good Behind the Wheel and Linking Up Smart Systems" M. Berger et al, Jan. 26, 1984, pp. 110–112.

Article: "High Technology Meets the Dashboard" P. Lienert, New York Times, Jan. 29, 1984, Section 12, p. 21.

Article: "Control Panels: From Pushbuttons to Keyboards to Touchscreens" W. R. Flynn, Control Engineering Special Report, vol. 31, No. 6, Jun. 1984, pp. 79–81.

Article: "More Electronics in Detroit's 1985 Models" R. K. Jurgen, Senior Editor, IEEE Spectrum, Oct. 1984, pp. 54–60.

Article: "Micros Hit the Road", D. Whiteside, Datamation, Oct. 1, 1984, pp. 22–26.

Article: "Space-age Technology Makes New Cards More 'Payload Sensitive'", C. E. Dole, The Christian Science Monitor, Oct. 25, 1984, pp. 29.

Article: "GM Tests Video Display in 1984 Production Car" D. M. Weber, Electronics Week, Nov. 12, 1984, pp. 28–29.

Article: "driving by Fingertip" Edited by J. A. Conway, Forbes, Nov. 19, 1984, p. 8.

Article: "Automakers Shift to Processors" R. Valentine et al, Electronics Week, Dec. 19, 1984, pp. 61–65.

Article: "Video Screen For Dashboard" M. Shuon, New York Times, Dec. 13, 1984, Section D2.

Article: "Centralized Electronics: Window to Tomorrow's Cars" C. E. Dole, The Christian Science Monitor, Apr. 22, 1985, pp. 28–31.

Article: "The High Tech Car Hits the Road" Peter Petri, Fortune, Apr. 29, 1985, pp. 204–224.

Article: "Slow and Steady is the New Strategy in Automotive Electronics" D. M. Weber, Electronics Special Report, Jun. 17, 1985, pp. 47–52.

Article: "Boob-Tube Buick" Jim Hall, Motor Trend, Apr. 1985, pp. 47, 50, 147.

Article: "Motoring at 6MHz" John Eckhouse, PC World Special Edition, Apr. 1986, pp. 108–109.

OTHER PUBLICATIONS

Brochure: "High Technology From Buick" Ref. Buick Riviera Graphic Control Center, Published by Product Information Buick Motor Division, (General Motors Division, USA).

Article: "An Interactive Reconfiguration Display System For automotive Instrumentation" Jesse Ortega et al, SAE Soc. of Automotive Engineers Congress and Exposition, Warrendale, PA, Feb. 24–28, 1986, pp. 1–14, Tech. Paper Ser. 860173.

Article: "At Your Fingertips: Computer Come Along For the Ride" J. Mateja, Discovery Magazine of American Travel, Silver Anniversary Edition, Spring 1986, p. 7.

Article: "Computerizing Cars" J. Zygmont, High Technology, Mar. 1986, pp. 60–61.

Article: "Can Touch-Screen Technology Move Beyond Special Uses?" T. Naegele, Electronics, May 5, 1986, pp. 42–43.

GDIS

GDIS WORK STATION

HARDWARE

* PERSONAL COMPUTER WITH HARD FILE
* 256 KB MEMORY
* DUAL DISPLAYS
* PRINTER
* HOST COMMUNICATIONS ADAPTER

GDIS
GDIS WORK STATION

SOFTWARE (GDIS SUPPORT)

* Vehicle Screen Generator
  - Monochrome - Color
* Post Processor
* Host Communication

GDIS

VEHICLE SCREEN GENERATOR

CREATE   EDIT   FILE

* Graphic Elements
* Icons and Symbols
* Touch Screen Functions
* Animation

GDIS

GRAPHIC ELEMENTS

GDIS
HOST COMMUNICATIONS

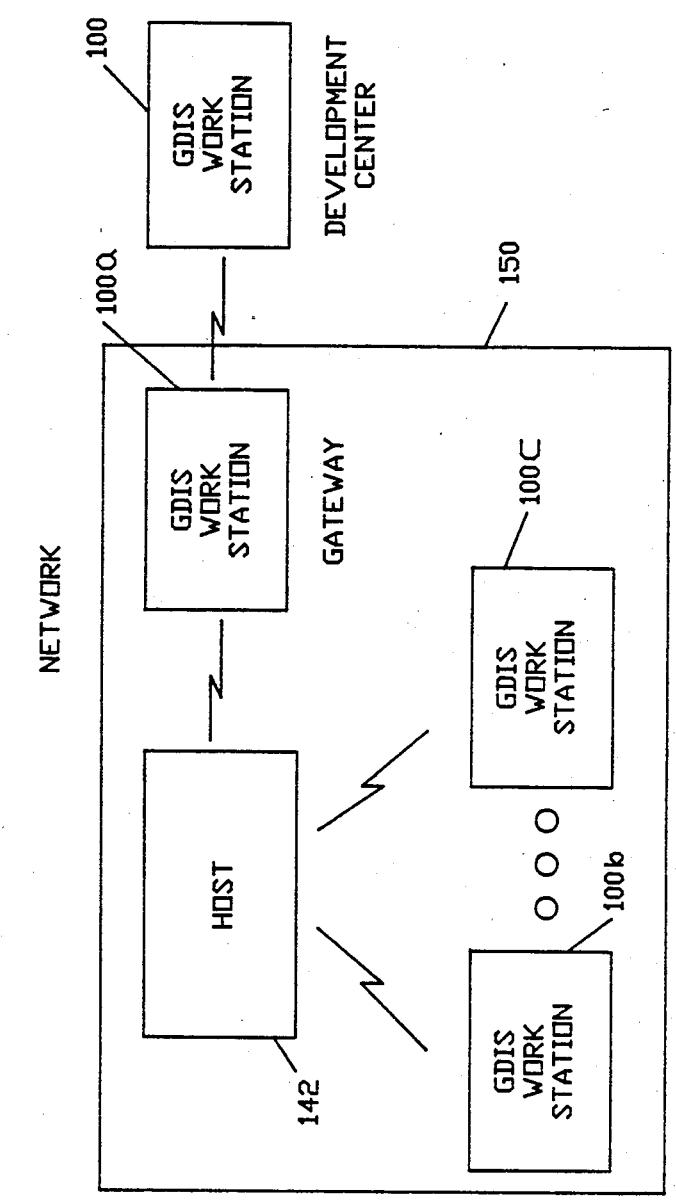

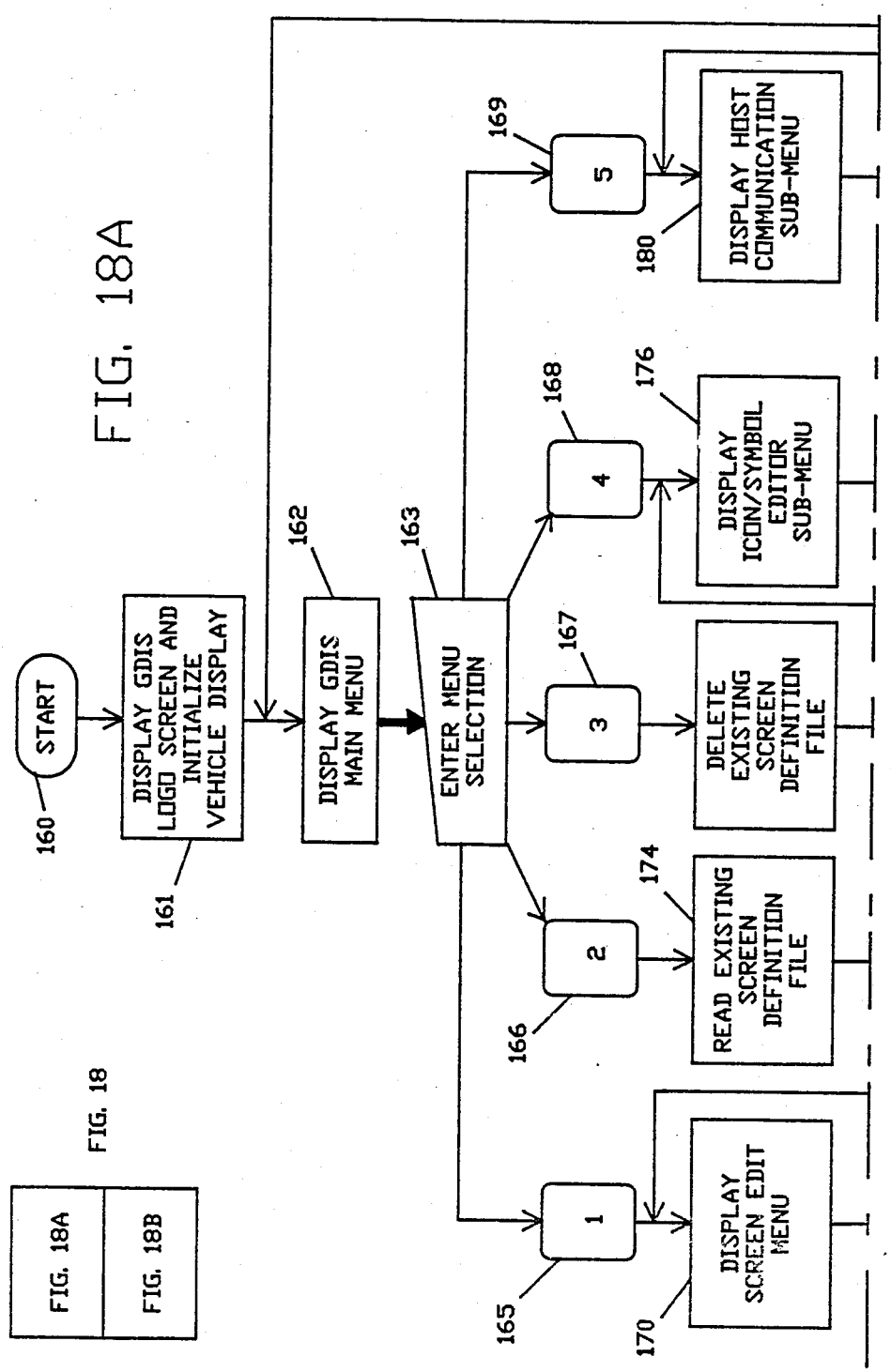

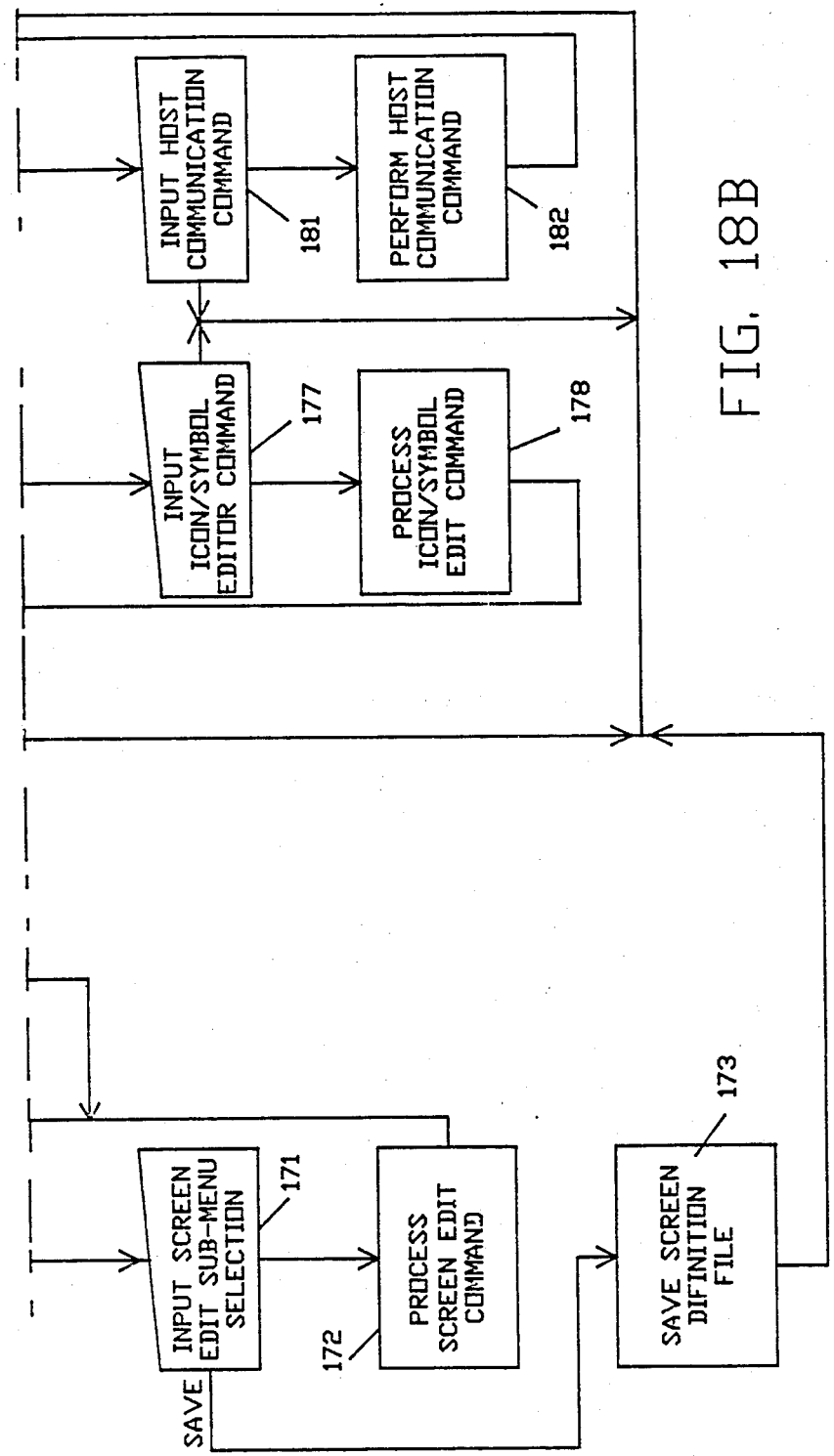

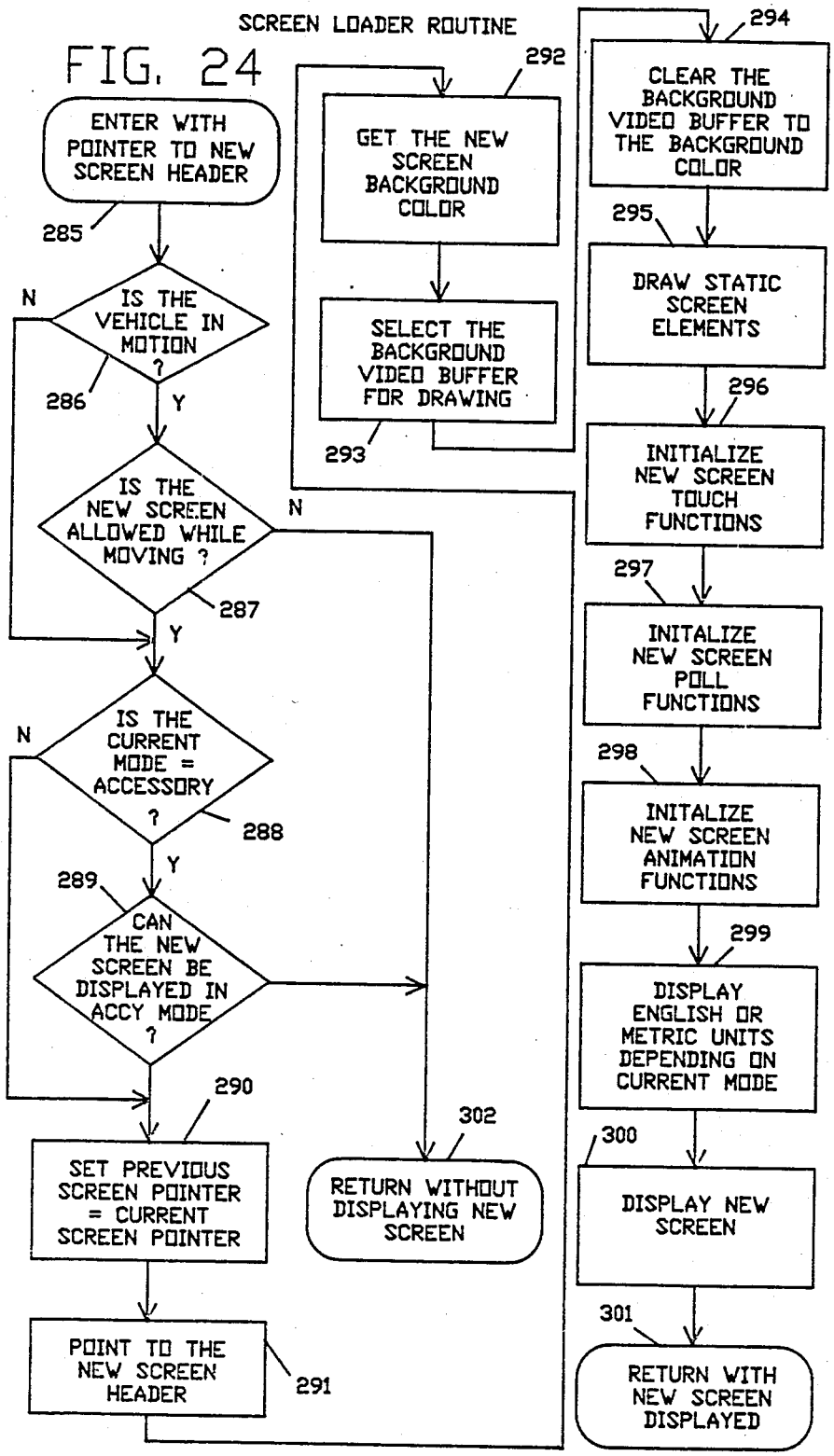
FIG. 24 SCREEN LOADER ROUTINE

SYSTEM FOR CREATING AND CONTROLLING INTERACTIVE GRAPHIC DISPLAY SCREENS

CROSS REFERENCE TO RELATED APPLICATION

Cross reference is made to the following application, such application having a common filing date and a common assignee with the present application.

U.S. patent application Ser. No. 06/945,053 filed Dec. 22, 1986 now U.S. Pat. No. 4,787,040, entitled "Display System For Automotive Vehicle" having R. N. Ames et al as inventors.

PRIOR ART REFERENCES

The following references are of interest and are representative of the prior art.

1. Article: "Evolving Microprocessors Which Better Meet The Needs Of Automotive Electronics" John Marley, Proceedings of the IEEE, Vol. 66, No. 2, February 1978, pp. 142–150.
2. Article: "Evaluating Pictographic Symbols: An Automotive Application" Paul Green et al, Human Factors, Vol. 20, No. 1, February 1978, pp. 103–114.
3. Article: "Simplification Of System Inputs And Outputs For MPU Control Units" John Marley, Society of Automotive Engineers, Technical Paper Series No. 780123, Feb. 27–Mar. 3, 1978, pp. 1–6.
4. Article: "An Innovative Approach In Designing An Electronic Instrument Cluster" Frederick O. R. Miesterfeld, Society of Automotive Engineers, Congress and Exposition Detroit, Mich. Technical Paper Series No. 810308, Feb. 23–27, 1981, pp. 101–106.
5. Article: "Multiprocessor Implementation Of The Logic Function Of A Multiplexed Wiring System For Automotives" N. C. G. N. Preston et al, IEE Proc., Vol. 129, Pt. E, No. 6, November 1982, pp. 223–228.
6. Article: "Touch Sensitive Displays For Operation And Control" Michael Menkin et al, Electronic Engineering, September 1983, pp. 177–180.
7. Article: "More Electronics In Detroit's 1985 Models" Ronald K. Jurgen, Senior Editor, IEEE Spectrum, October 1984, pp. 54–60.
8. Article: "Micros Hit The Road", David Whiteside, Datamation, Oct. 1, 1984, pp. 22–26.
9. Article: "GM Tests Video Display In 1984 Production Car", David M. Weber, Electronics Week, Nov. 12, 1984, pp. 28–29.
10. Article: "Automakers Shift To Processors" Richard Valentine et al, Electronics Week, Dec. 10, 1984, pp. 61–65.
11. Article: "An Interactive Reconfigurable Display System For Automotive Instrumentation" Jesse Ortega et al, SAE Society of Automotive Engineers Congress and Exposition SAE, Warrendale, Pa. Feb. 24–28, 1986, pp. 1–14. Technical Paper Series No. 860173.
12. Article: "Motoring At 6MHz" John Eckhouse, PC World, April 1986, pp. 108–109.
13. Brochure: "High Technology From Buick" Ref. Buick Riviera Graphic Control Center Published by Product Information Buick Motor Division, (General Motors Corporation, USA).

BACKGROUND OF INVENTION

Automobile manufacturers are adding Graphic Display Centers (GDC) to their high tech vehicles. This will be a continuing trend over time. The GDC contains a display and a mixture of hard and soft switches. Use of a display, like a CRT, offers the capability to provide a large amount of information to the vehicle operator. The hard switches are used to display the basic screens. A touch screen which overlays the display provides for screen related "soft" switches whose functions are unique to the screen being displayed. Many of the soft switches, when actuated, cause sub-screens of the base screen to be displayed. Sub-screens can in turn cause other sub-screens to be invoked. Each vehicle using a GDC will usually contain over 100 screen definitions. Screens contain a multiplicity of different types of display elements such as Icons, Symbols, lines, boxes, circles, text, etc.

Today the screens used in the GDC are first designed and displayed on a computer screen. Either the full computer screen or a portion of the screen is used to simulate the vehicle display. The aspect ratio and color of the screen is different than the vehicle display. A time consuming process is required for a screen to be viewed on the actual vehicle screen. This requires processing of the developed screens using series of programs that allow generating a screen image that can be burned into an EPROM. Once generated the EPROM must be installed and run on a bench test setup that contains the actual vehicle display. When viewed on the actual vehicle display, changes may be necessary due to the vehicle display being different than the display that was used to develop the screen. Changes necessitate going back to the computer, modifying the screen and going through the long and tedious procedure of burning an EPROM and displaying the screen on a bench test setup.

This invention relates to Graphic Display Systems and more particularly to a more efficient system for creating and utilizing the code and display screens resulting therefrom.

As noted, automobile companies are making greater use of Display devices in their vehicles. Such a device typically includes a Controller such as that described in the Cross Referenced patent application noted above and provides for inputs by the vehicle operator as well as display of a variety of screens. Thus, a greater need exists for being able to create and update the screens for use in such vehicles. In particular, in accordance with the present invention such creation and updating is performed without modifying the software that is utilized in the system.

The primary object of the present invention is to provide an effective system for developing and adapting screens for use in automotive vehicle display systems.

SUMMARY OF THE INVENTION

The present system provides a method and capability to design, create and update automotive display screens, and is able to include any Controller function, without rewriting or modifying any software.

In the inventive system described herein, Interactive Graphic display screens are displayed in a manner which does not require the control program to be changed when a screen design is changed. This invention is made possible by a table based screen data structure and control program architecture that allows the control program to efficiently identify and use each screen's design data to update the display and perform actions in response to recognized stimuli such as touch key activation, communication message data, internal conditions, etc.

This invention also eliminates the problem of not being able to view automobile screens on the actual auto display as they are created or modified.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 17 shows a typical GDIS network.

FIG. 18 is a composite of FIGS. 18A and 18B which represent a flow chart of the GDIS control program.

FIG. 24 is a flow chart of the Screen Loader routine which is also part of the vehicle display system controller software.

ABBREVIATIONS

Figure 1:
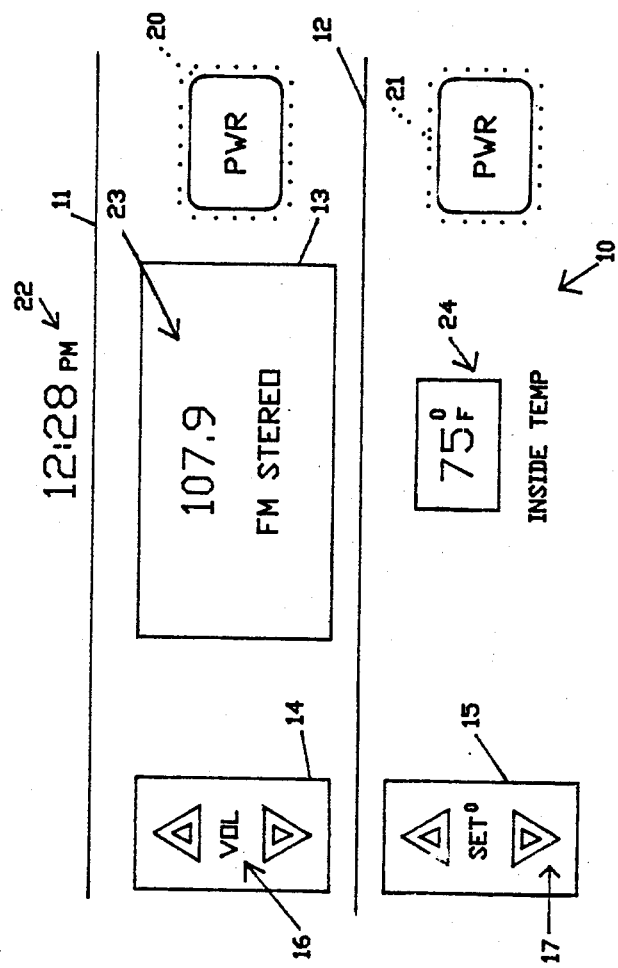
FIG. 1 illustrates a typical display screen.

The following abbreviations are occasionally used herein:

| Abbreviations | Definition |
| --- | --- |
| CRT | Cathode Ray Tube |
| CRT DIM IN | Dimming Control line for CRT |
| CXEDRAW | Graphics Language Routines |
| DCS | Display Controller System |
| EPROM | Erasable Programmable Read Only Memory |
| EEROM or EEPROM | Electrically Erasable Read Only Memory |
| GDIS | Graphics Development Instrument System |
| GDL | Graphics Design Language |
| GND | Ground |
| HSYNC | Horizontal Synchronization |
| IGN1 | Ignition Switch 1 |
| IGN2 | Ignition Switch 2 |
| INITKEY | Initialize Key Number |
| KB | Kilobyte |
| PWR | Power |
| RAM | Random Access Memory |
| ROM | Read Only Memory |
| RTN | Return |
| SDL | Serial Data Link |
| $\overline{TCON}$ | Not Touch Controller On |
| TEMP | Temperature |
| UART | Universal Asynchronous Receiver Transmitter |
| V SYNC | Vertical Synchronization |
| VBAT | Battery Voltage (+12) |
| VBATF | Filtered Battery Voltage |
| VGA | Video Gate Array |
| VOL | Volume |

The following circuit blocks are included in the drawings:

| Block | Function/Description |
| --- | --- |
| 80C88 | Intel Microprocessor (CMOS) - 8088 |
| 80C31 | Intel Microcontroller (CMOS) - 8031 |
| 82C55 | Intel Programmable Interface Adapter - 8255 |

DETAILED DESCRIPTION OF GRAPHIC DISPLAY AND DEVELOPMENT SYSTEM

The present invention is best understood in conjunction with the Vehicle Display System described in the above referenced related patent application and the Graphics Development Instrument System (GDIS) described herein.

The Vehicle Display System consists of a CRT display and monitor electronics, a touch switch matrix and decoding electronics, and the system controller electronics. The Vehicle Display System controller is a computerized unit which controls the operation of a touch sensitive video display. The controller is intended to be connected to a touch activated color or monochrome CRT display and to be used in an automobile to provide for the control and monitoring of various vehicle functions. The touch sensitive display system serves as a centralized command center for control of the vehicle's Climate control system, radio, and trip computer. Several convenience functions are also provided.

The display may also visually indicate the status of the vehicle's electrical and mechanical systems. The Controller continuously monitors these systems via Serial Data Links and Discrete interconnections with the vehicle's electrical system. It will provide appropriate messages to the driver of the vehicle in the event of a condition which requires the driver's attention. An automatic maintenance log is also provided to remind the driver when scheduled service is required and to record the service mileage and date of service permanently. An on-line owner's manual may also be displayed to provide information such as filter types/sizes, fluid types/capacities, etc. Some other features are listed below:

Automatic Cellular Telephone Dialer and Directory
Electronic Compass Display
Appointment Calendar with Automatic Reminder Calculator As previously noted, automobile manufacturers are adding Graphic Display Centers (GDC) to their high tech vehicles. The GDC contains a display and a mixture of hard and soft switches. Use of a display, like a CRT, provides the capability to provide much more information to the vehicle operator. The hard switches are used to display the basic panels. A Touch Panel which overlays the display provides for panel related "soft" switches whose functions are unique to the panel being displayed. Many of the soft switches when actuated cause sub-panels of the base panel to be displayed. Sub-panels can in turn cause other sub-panels to be invoked. Each vehicle using a Display System will contain over 100 panel definitions. Panels contain a multiplicity of different types of display elements such as Icons, Symbols, lines, boxes, circles, text, etc. An element is further classified into one of two categories, Static or Dynamic. A Static element is one which never changes while the panel is displayed. A Dynamic element is one which will change as a result of some form of stimulus such as the activation of one of the soft switches on the panel, a message from some other controller, output from a sensor, etc. A panel definition must therefore include, in addition to the graphic elements, specifications of the functions to be supported. Up to now, each of the dynamic functions defined within each of the panels is supported by a unique custom program module. Given the number of panels per vehicle type, the number of vehicle types to be supported and the amount of programs associated with dynamic elements, the resources required to develop panels for a vehicle Display System has become exorbitant. The GDIS apparatus defined by this invention solves this problem.

Prior systems require design, coding and testing controller software when display screens are created or modified. The GDIS system allows for rapid update of a vehicle's screen set, so that the testing efforts of the screen designer are concentrated on the screen contents and its interaction with the operator, and not on the software that drives the system.

This system also creates an indexed table structure for the Graphic Screen Data to allow the Control program to quickly identify and use the elements which compose the screen without having to modify the Control program when a screen design is changed.

Thus, the GDIS allows the screen designer to incorporate any Controller function on any screen, and to create the EPROM's of those screens, without having to write or modify any code. This feature allows the designer to quickly change any button or graphic definition of any screen. However, the key attribute of GDIS is that it allows the screen designer to freely specify which controller functions are made available on a screen; and after some human factors testing, he can add or subtract functions or elements from it as needed. This is accomplished using first the GDIS program to draw the screen. Its output consists of Graphics language statements representing the images, button definitions and controller functions of a screen.

Controller functions are those features and options of a car that can be associated with Graphics elements. For example, the radio "ON" status of a radio is defined as a Controller function that can be included in any screen definition. This feature of GDIS allows the automobile screen designer to experiment with several screen designs, including touch button definitions, in order to achieve the best results.

The language output of the GDIS utility program is run through a Post-Processor program to complete the definition of a vehicle's screen set. The output of the Post-Processor program is assembled using the Macro Assembler, in order to create the screen definitions the Controller will use in the vehicle. A series of conversion steps produces the EPROM that is installed in vehicle.

Also described herein is the architecture of the data structure and Control program that provides the ability to display interactive Graphic display screens in an efficient and structured manner. This architecture allows the screen designs (screen data) to be changed without requiring corresponding changes in the program that controls the display of the screens. The indexed structure of the screen data allows the Control program to efficiently interpret and manipulate the Graphics elements that compose each screen to achieve the desired visual effects. The effects can include normal updating of display information due to changes in variable data as well as simple forms of animation. A typical display screen is shown in FIG. 1. This invention supports actions which are to occur when a stimulus is detected by the Control program. In the case of the Controller, the stimulus can take the form of a Touch Switch activation, internal condition, of a message being received from one of the Serial Data Links that provide communications and that are supported by the Controller.

All Graphic screens displayed by the Vehicle Display System are based on Graphic Screen Data contained in a ROM memory. The screen data is created with the Graphics Development Instrument System. The Table based structure of the screen data allows the screen designs to be changed without changing the Control program. The Table based architecture is an important feature of this invention. The Graphics Screen Data is compacted to provide maximum use of available ROM memory space. This data contains tables which point to and describe graphic elements and animation sequences, specify Touch switch function assignments, and indicate which Polling functions are used by each screen.

The compacted Graphics Screen Data is converted on demand to software function calls by the Graphics Language Interpreter (part of the Control program). The Graphic Language Interpreter controls the drawing of lines, rectangles, filled rectangles, circles, filled circles, filled triangles, bar graphs, three character fonts, and custom two color symbols and icons. Also supported is the ability to display symbols or icons in a sequence to allow the creation of simple animation effects.

Functions which occur as a direct result of a Touch switch activation are performed by execution of a program subroutine written specifically for each function. The collection of subroutines to handle all the Touch activated functions allowed by the Controller and a calling routine to perform the Touch Switch to Function conversion is known as the Touch Function Handler. The Touch Function Handler is responsible for performing the desired action and for displaying the appropriate graphical response on the display. Touch functions are specified by Dynamic Element Names assigned to Touch elements by the Graphics Development Instrument when the screen is created. The graphical response to a Touch function is specified by the Dynamic Element Names assigned to the screen's graphical elements when the screen is designed.

Graphical responses to changes which are not the direct result of Touch Switch activation are known as Poll functions. These functions include the updating of values such as the time of day, trip odometer, etc, and the updating of certain indicators such as the stereo status. The Poll Function Handler software updates the Display screen several times each second. Each time the control program calls the Poll Function Handler, a Poll function is executed from the list in the displayed screen's Poll function data table. Poll functions are specified by unique Dynamic Element Names assigned to Graphic Elements when the Display screen is designed.

The display and speed control of graphical animation is performed by Animation Handler software. Each kind of animation sequence is handled by an associated program subroutine. Each subroutine is called by a Calling program driven by the currently displayed screen's Animation function data table. Each time the Animation Handler is called by the Control program all animation sequences on the screen are updated. The Animation sequence parameters are also specified via the GDIS.

Three text character fonts are supported by the Controller to allow the display of text and numerical information. The standard ASCII character set is supported by the Graphics Language Interpreter. The font data may be changed to support different character sets, for example, three different character sets are implemented. The sets provide characters of 8×8, 8×14, and 16×28 pixels in size. The character background and foreground colors and font are specified at the time the screen is designed with the Graphics Development Instrument System.

SCREEN DATA CREATION

For each Display screen that is created with the Graphics Development Instrument System (GDIS), a Graphic Design Language (GDL) text file which describes the screen design is generated. The GDL text file for the screen shown in FIG. 1 is listed in the appendix. After a screen is designed and is saved as a GDL text file, it must be post-processed and assembled to create the necessary tables and data which identify and describe the screen's Graphical elements, Poll functions, Animation sequences, and Touch functions. The Graphics Development Instrument System, Post-Processor program translates the GDL text file into a screen assembly file and adds the necessary macro function calls to allow the macro assembler to create the appropriate data tables which allow the Control program to properly display and update the screen's graphical elements. Custom Post-Processor assembler macros are required for the proper assembly of a screen's GDL file. In addition to the macros, several other files which define the Dynamic Element Names, Touch functions, and Animation functions which are supported by the Control program are required by the Assembler. These files may be changed depending on the functions supported by various models of the Controller. The screen assembly file is then assembled with the IBM Macro Assembler to create a screen object file. Screen object files are combined into a screen set by the DOS Link program to create a screen set EXE file. This file is then converted to a binary file to be programmed into an EPROM for use in a Controller.

SCREEN DATA STRUCTURE

Figure 20A:
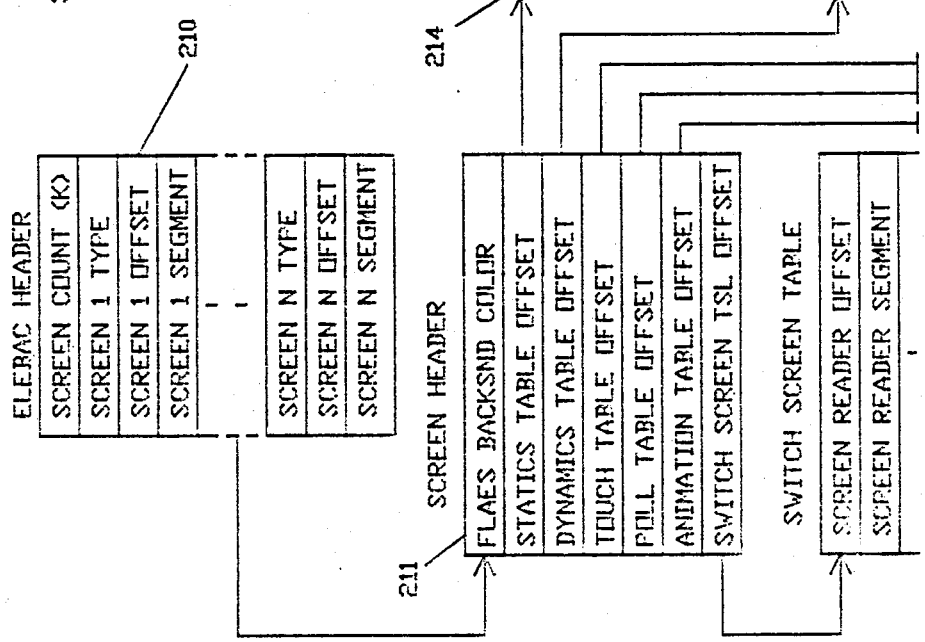
FIG. 20 is a composite of FIGS. 20A, 20B and 20C which represent a block diagram of the screen data structure generated by the Post-Processor program.
Figure 20B:
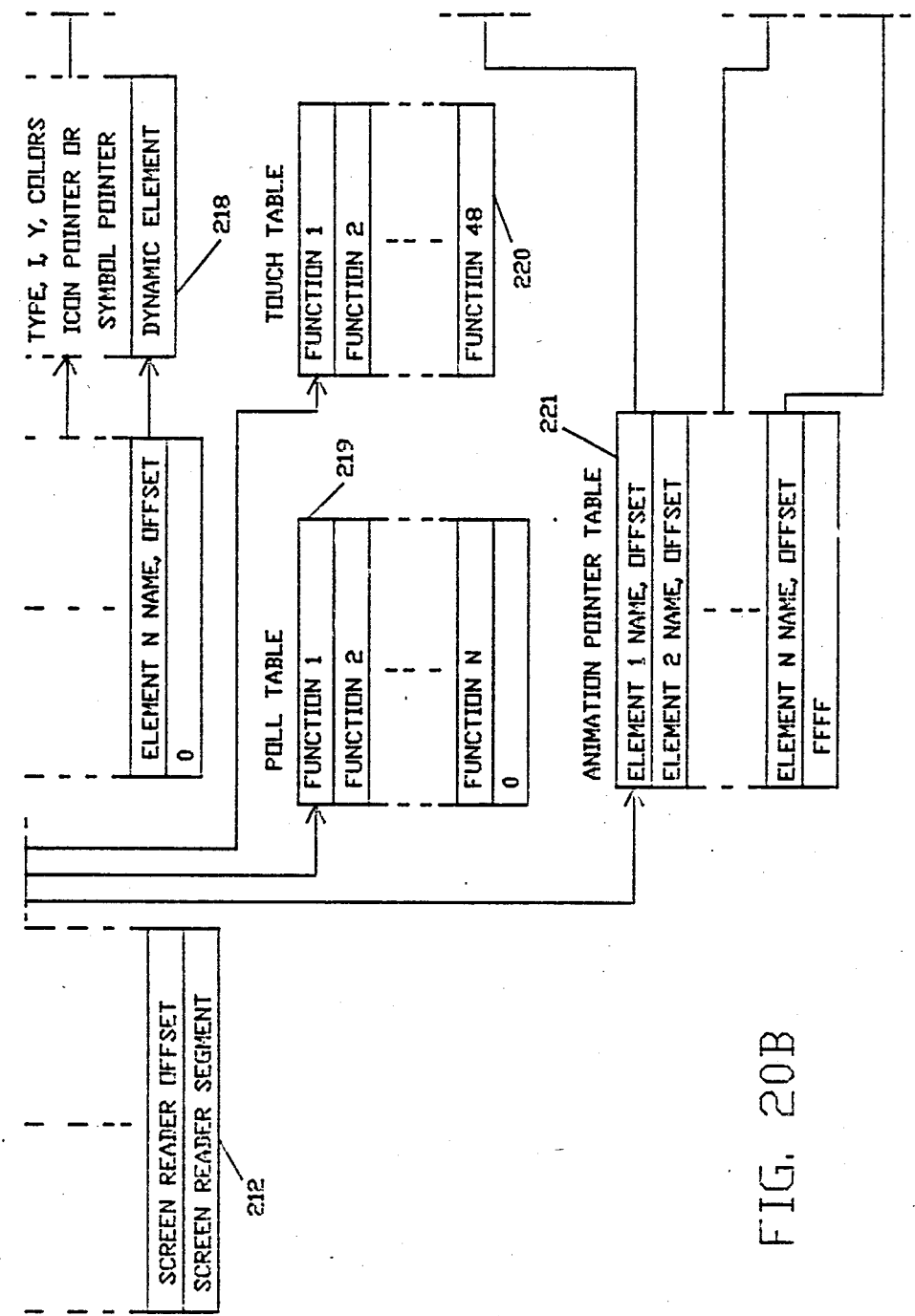
Figure 20C:
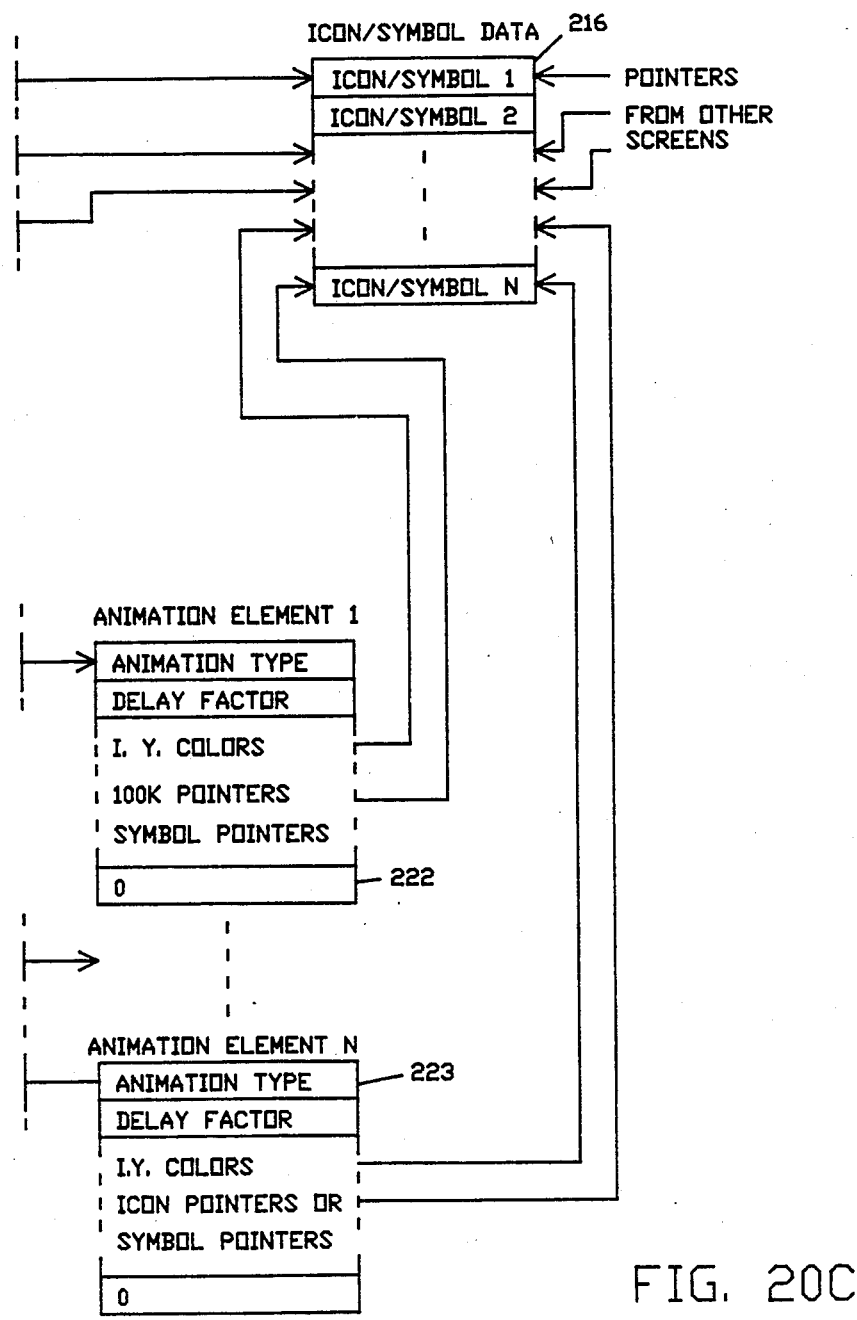

The Table structure of the Screen data consists of a global header, a screen header for each screen in the screen set, and Graphic display data for each screen in the screen set. The Table structure of this binary file is shown in FIG. 20. Static graphic elements are present in each screen's data and are displayed when the screen is first displayed. Also, depending upon the design of each screen, additional data tables may be present in a particular screen's data to describe Dynamic Graphical Elements as well as Touch, Poll, and Animation Functions which were specified via the GDIS when each screen was designed. These additional tables are used by the Control program to identify and manipulate the Dynamic Graphic Elements, perform Touch functions including switching to new screens, perform Poll functions, and perform Animation functions.

The typical Display screen shown in FIG. 1 is composed of screen elements. There are two basic types of screen elements, Static elements and Dynamic elements. Static elements are shown in FIG. 1 as items 11, 12, 13, 14 and 15. These elements are lines and boxes which will be drawn on the Display screen and will never be changed until a new screen is disllayed. Other elements on the screen which are Static are elements 16 and 17. Element 16 is a static text element VOL representing the volume up and down for the radio function. Item 17 is a Static symbol representing a down arrow for the set temperature controls. Also shown is Item 22, a Dynamic text element for the time of day clock. Dynamic Icons 20 and 21 represent power switches for the radio and climate control system respectively. Other Dynamic elements include Items 23 and 24 for the Radio station display and inside Set Temperature display. The display screen in FIG. 1 is typical of that generated with the GDIS system and displayed on the vehicle Display system. Touch functions associated with the Display are also assigned using the GDIS system.

Figure 2:
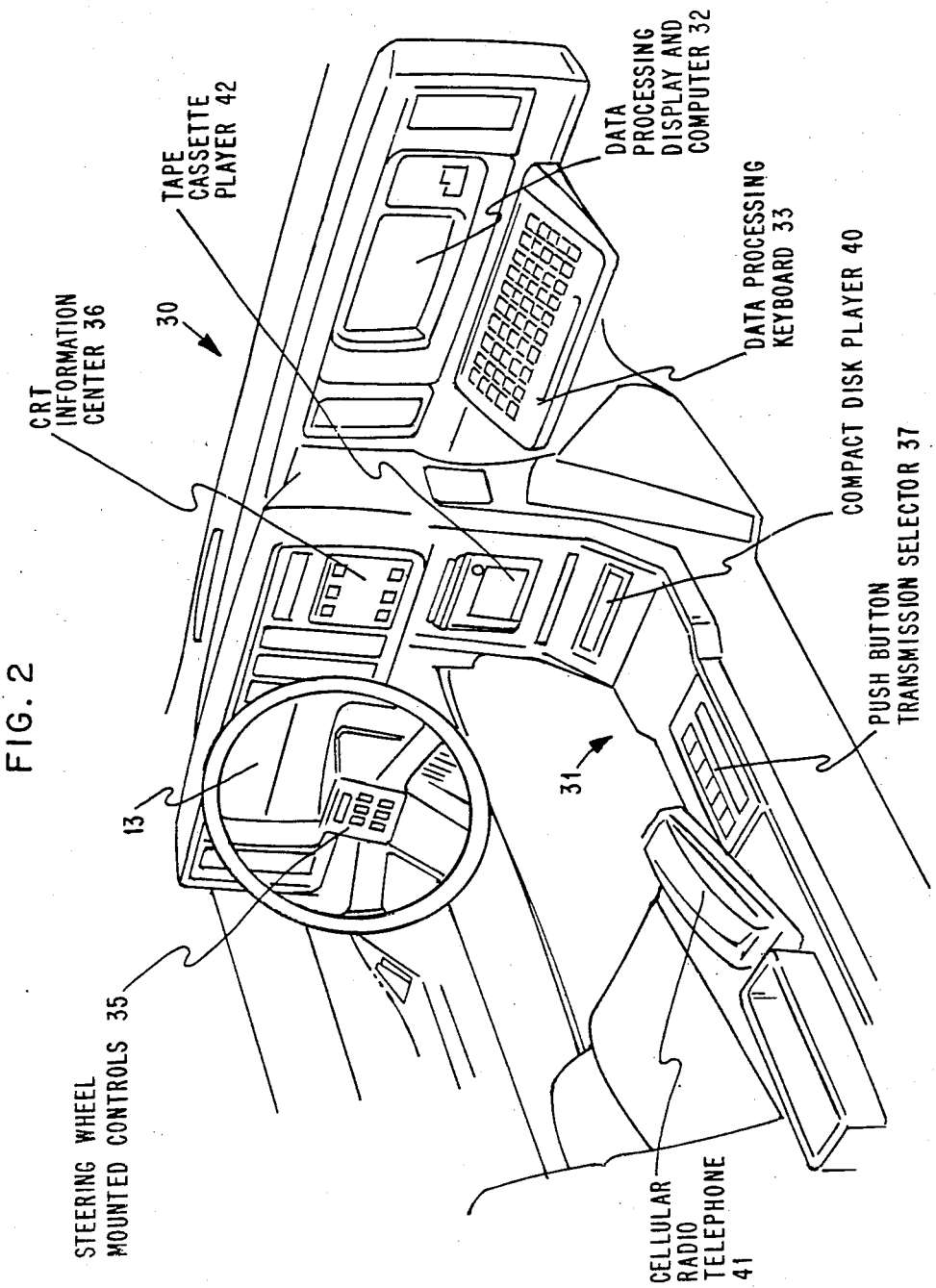
FIG. 2 illustrates the interior of a typical vehicle.

FIG. 2 represents the interior of a typical automobile. Illustrated in FIG. 2 is a dashboard 30, an instrument panel 13, a data processing display and computer unit 32, data processing keyboard 33, CRT information center 36, steering wheel mounted controls 35, console 31, with compact disk player 40, tape cassette player 42, push button transmission selector 37, and cellular radio telephone 41. Display screens such as that depicted in FIG. 1 would typically be displayed on the CRT Information Center 36.

Figure 3:
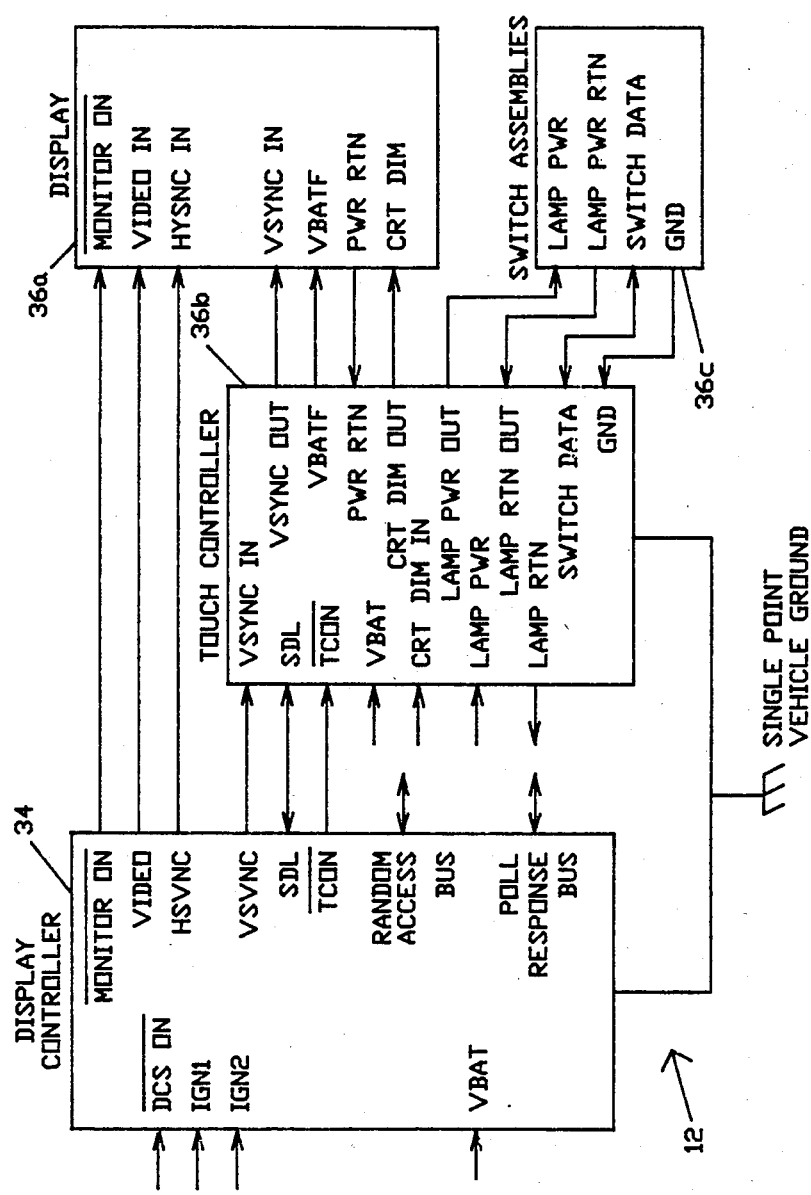
FIG. 3 is a block diagram of the vehicle display system.

FIG. 3 is a block diagram of the Vehicle Display System hardware showing a Display Controller 34, Display 36a, Touch Controller 36b, and Switch Assemblies 36c. Also shown are various interconnecting signal lines. A system of this nature is described in the above cross-referenced patent application.

Figure 4:
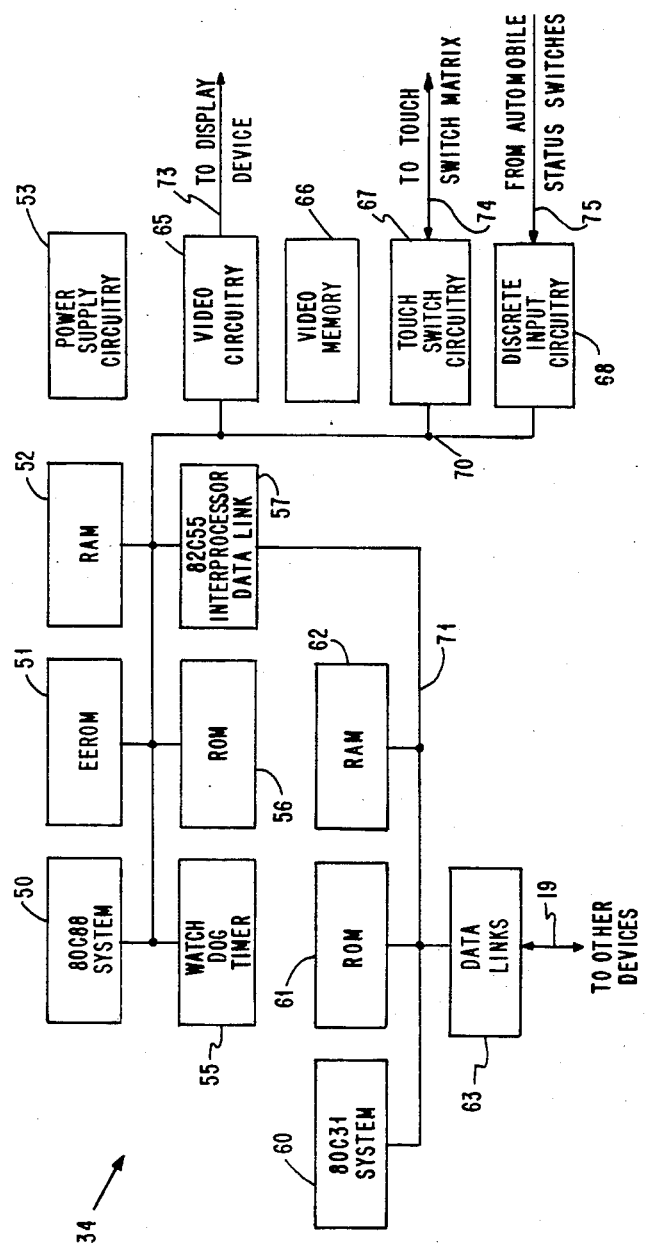
FIG. 4 is a block diagram of a vehicle display controller that is useful in the system of FIG. 3.

FIG. 4 is a high level block diagram of the Display Controller hardware. Shown are the 80C88 processor system block 50, EEROM block 51, RAM block 52, ROM block 56, and Watch Dog Timer block 55. An Interprocessor Data Link based on an 82C55 chip is shown in block 57. The 80C31 Microprocessor system block 60 is interconnected with ROM block 61, RAM 62, and Data Links block 63, via bus 71. Bus 70 interconnects the 80C88 system block 50 with the Video circuitry block 65, Touch Switch circuitry block 67 and Discrete input circuitry block 68. Also shown is Power Supply circuitry block 53.

Figure 5:
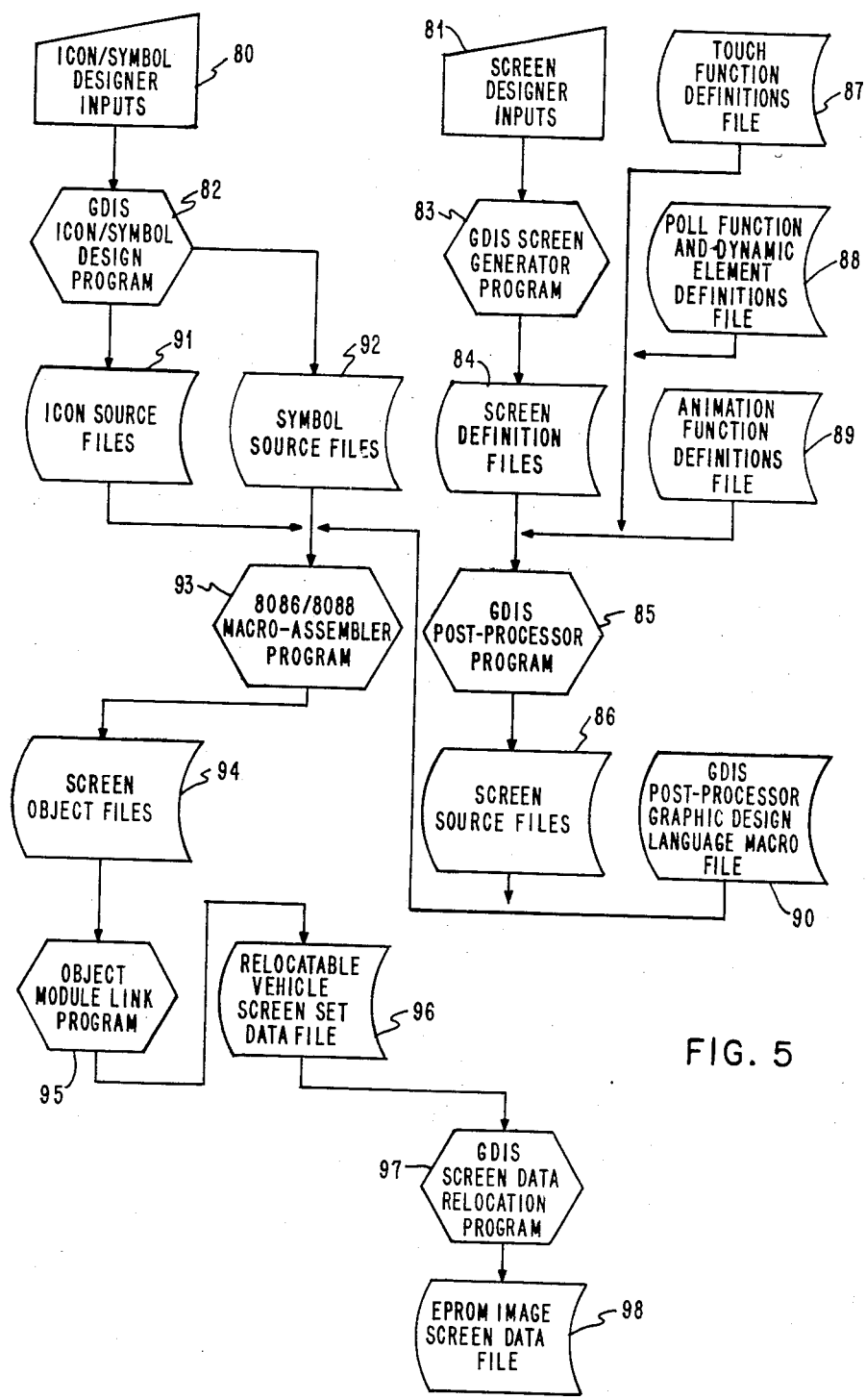
FIG. 5 is flow chart of the screen development process.

FIG. 5 is a flow chart of the Screen development process. Blocks 80 and 81 illustrate Screen, Symbol, and Icon designer inputs from the GDIS keyboard. Inputs from the keyboard are accepted by blocks 82 and 83. The GDIS Icon and Symbol design program and GDIS Screen Generator programs respectively. The output of the GDIS Icon and Symbol design program block 82 creates Icon source files block 91 and/or Symbols source files block 92. The output of the GDIS Screen Generator program block 83 generates screen definition files block 84. Block 85 depicts the GDIS Post-Processor program which accepts Screen Definition files 84, Touch Function Definition files 87, Poll Functions and Dynamic Element Definitions file 88, and Animation Function Definitions file 89 as input. Its output is Screen Source files block 86 which are assembled along with the Symbol Source files block 92 and Icon Source files block 91 using the GDIS Post-Processor Macro file block 90, by the the Macro Assembler program block 93, which creates Screen Object files block 94, which are then linked with other Screen Object files in a particular vehicle Screen set by Object Module Link program block 95 to create the relocatable vehicle Screen Set Data file block 96. This file may then be relocated by the GDIS Screen Data relocation program to create an EPROM Image Screen Data file which is then used to create the EPROM chip which will reside in the Controller hardware.

The following tabulates various programs utilized in the development process.

| Program Name | Operator | Action |
| --- | --- | --- |
| GDIS Utility | Screen Designer | Interactively Design Screens |
| GDIS Post-Processor | Screen Designer | Create Control Tables |
| Macro Assembler | Screen Designer | Create Screen Object Data File |
| DOS Link | Screen Integrator | Combine Screens into Screen Set |
| EXE2BIN | System Integrator | Create Screen Set EPROM image |
| EPROM Programmer | System Integrator | Program Screen Set into EPROM |

Figure 6:
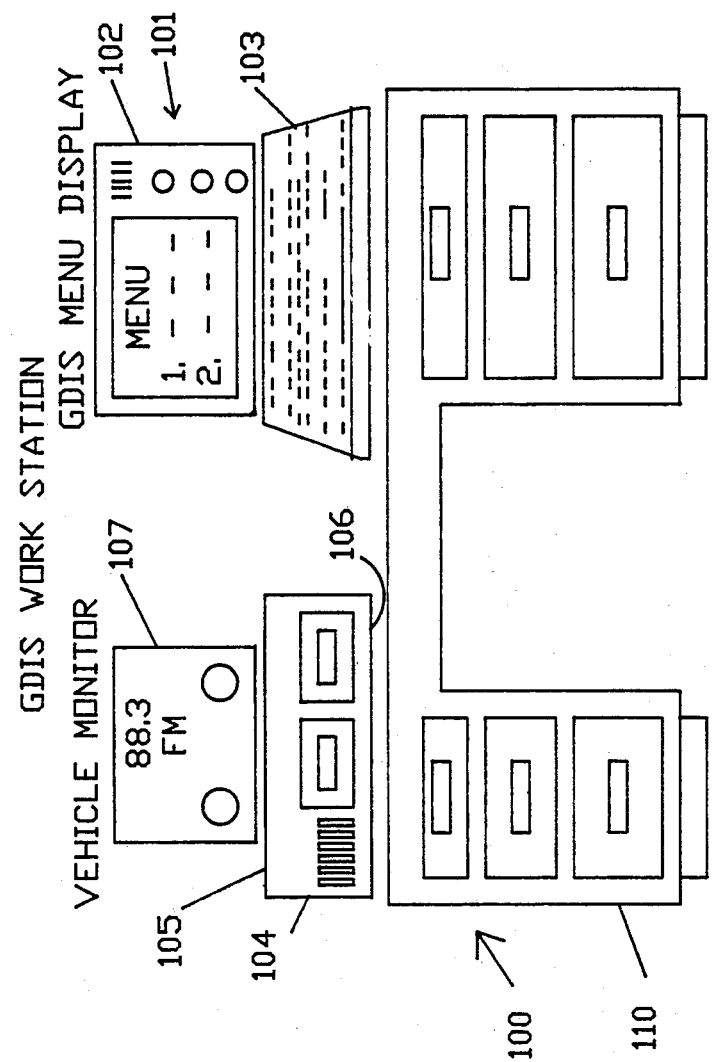
FIG. 6 is a pictorial view of a Graphics Development Instrument System (GDIS) work station.

FIG. 6 is a drawing of a typical GDIS workstation 100. Components of the workstation include the keyboard 103 for the GDIS menu display, the CRT monitor 102, system unit 104, diskette drive 105, fixed disk 106, vehicle display 107 and desk 110.

Figure 7:
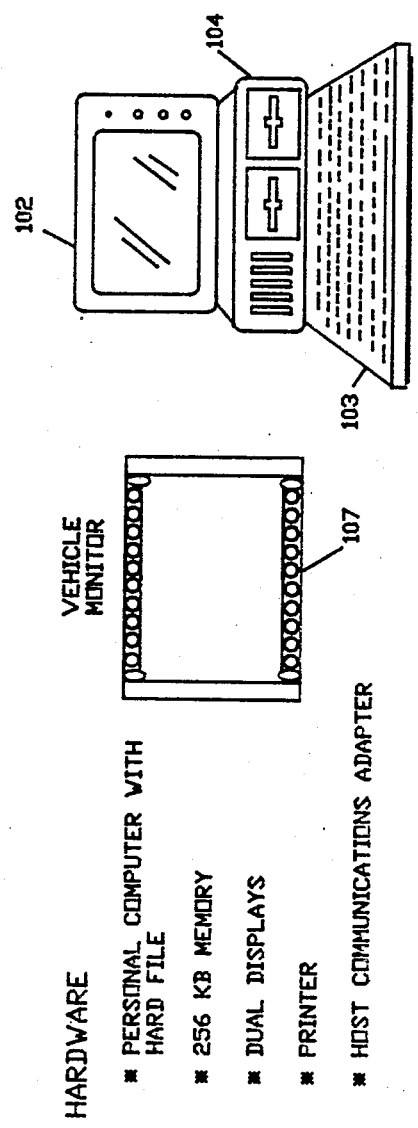
FIG. 7 shows a list of the GDIS work station hardware.

FIG. 7 is a listing of the GDIS workstation hardware. Shown are a personal computer 104 with hard file, keyboard 103, dual displays 102 and 107. Also listed but not shown are the Printer and Host communications adapter.

Figure 8:
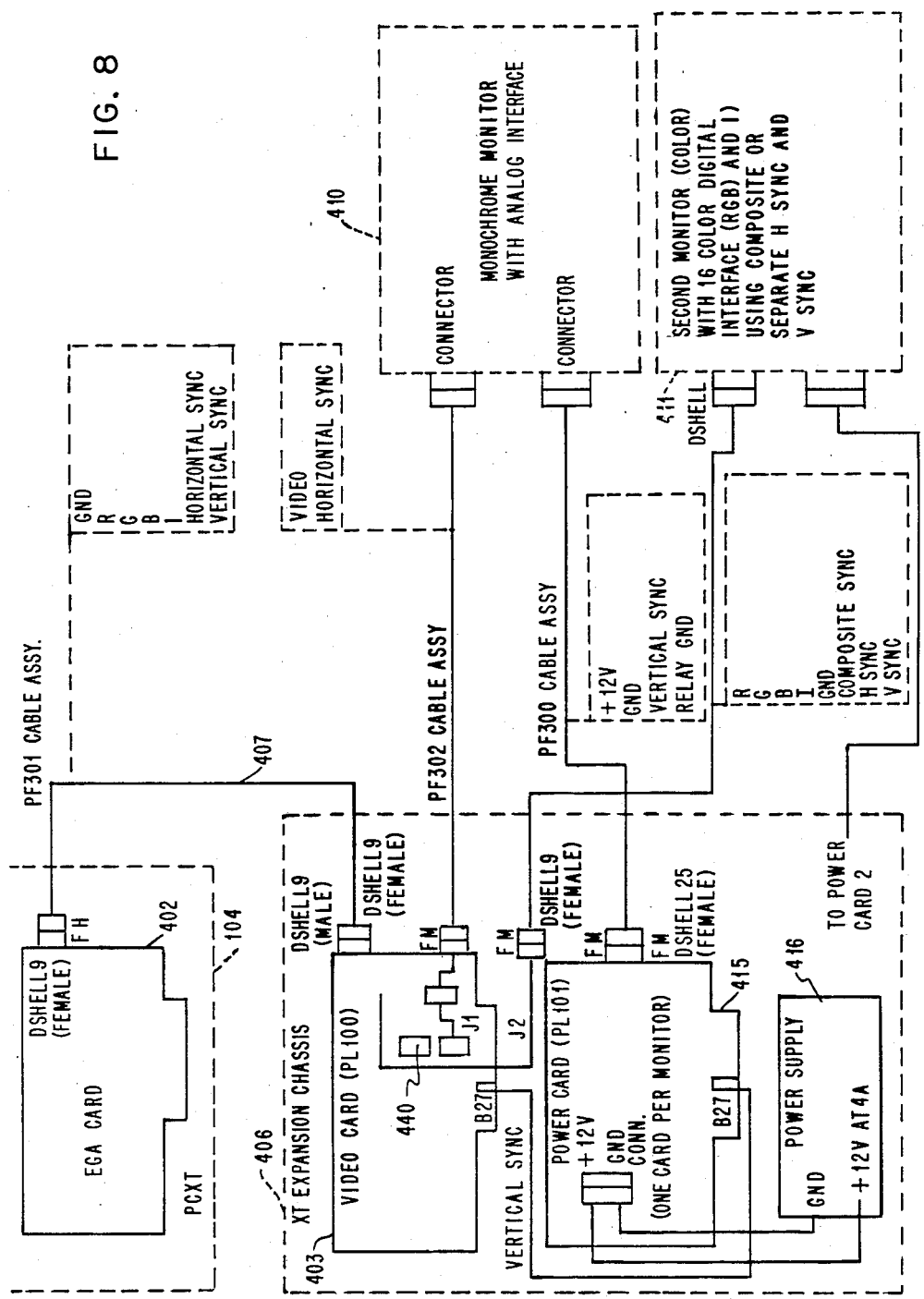
FIG. 8 is a more detailed block diagram of the GDIS work station of FIGS. 6 and 7.

The Graphic Display Instrument System (GDIS) hardware is further illustrated in FIG. 8 in block diagram form. In this case, it includes a PC XT/AT* based unit with a modified expansion chassis. The PC XT/AT 104 contains an Enhanced Graphics Adapter (EGA) card 402 which provides video signals to a video adapter card 403 (PL100) in the expansion chassis 406 through a coaxial cable 407 (PF301). The video adapter card in the expansion chassis modifies the video signal to support a monochrome monitor 410 and a color monitor 411. Power to each monitor is provided by a power card (PL101) designed specifically for the GDIS.

* Personal Computer product(s) of International Business Machines Corporation

Figure 9:
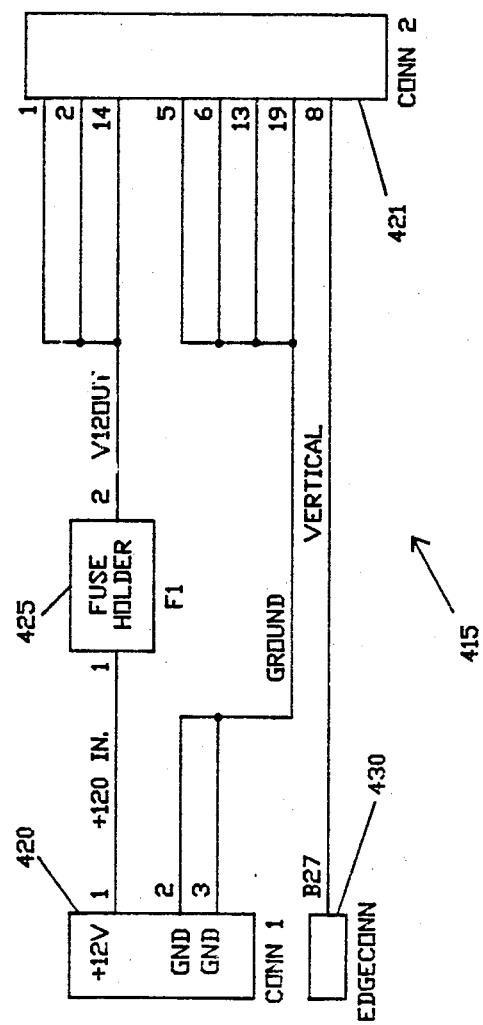
FIG. 9 illustrates a power card used in the work station of FIGS. 6–8.

The power card 415, detailed in FIG. 9 provides an interface for the power supply 416 in the expansion chassis and for the vertical sync signal to one monitor (monochrome shown connected) via cable assembly 417 (PF300). The power supply +12 V and ground connect to CONN1 420 and exit through the 25 pin D shell connector 421 (CONN2). The +12 V is fused at 425 to limit current to 4 amperes. The vertical sync signal enters the card via edge connector 430 from the expansion chassis mother board and exits at connector 421 CONN2. A second power card is required if two monitors are used.

Figure 10:
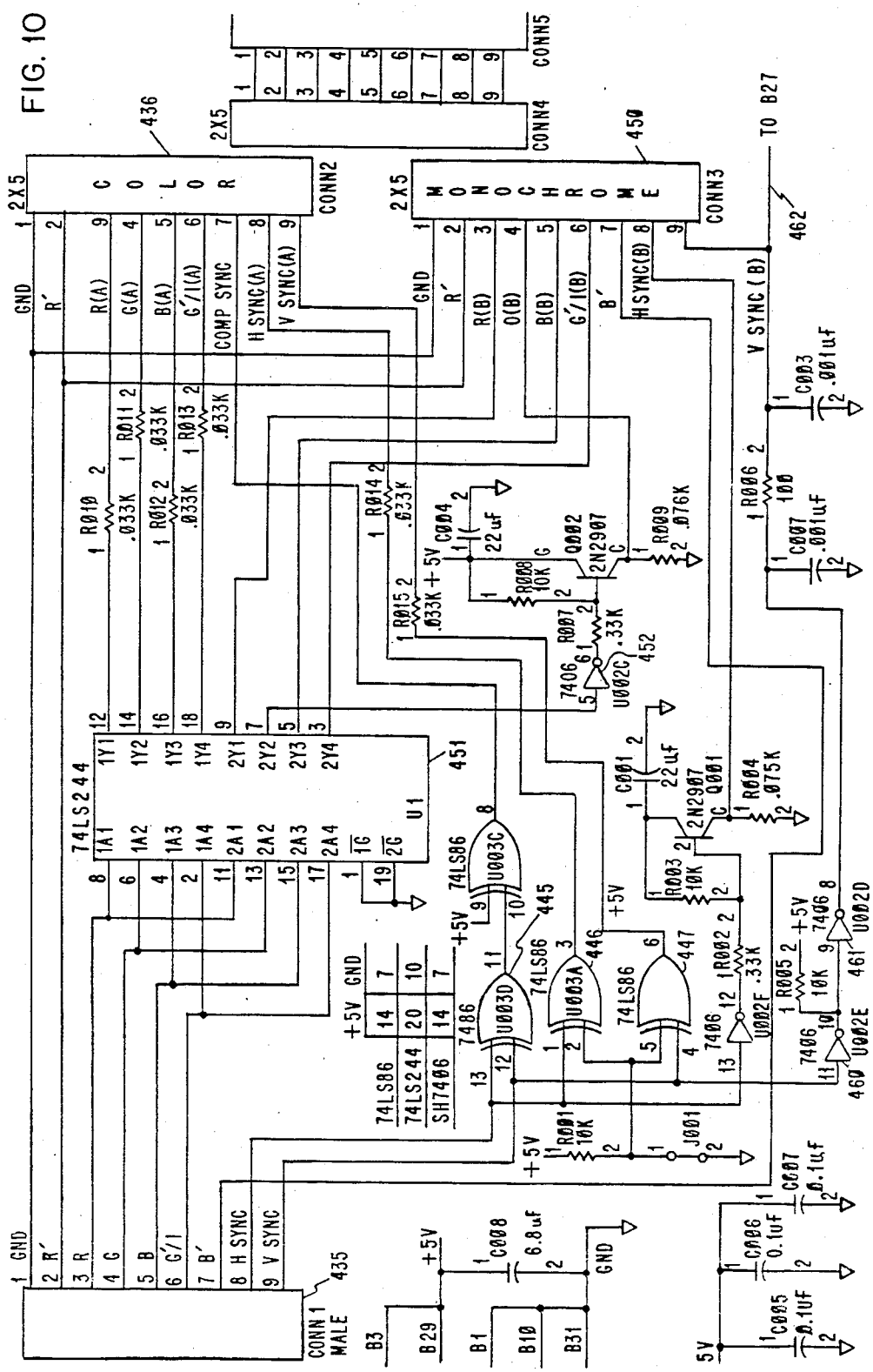
FIG. 10 shows details of the video card used in the work station of FIGS. 6–8.

The video card 403 is detailed in FIG. 10 and supports one monochrome monitor with analog interface and a second monitor (color) with 16 color digital interface (R, G, B, and I), using composite sync or separate horizontal and vertical sync.

The input video signal to the card appears at connector 435 CONN1. The video signals to the color display are buffered without inversion through jumper connector 436 CONN2 (shown in FIG. 10). FIG. 8 illustrates jumper 440 J2 connecting the color video signals to the color monitor. FIG. 10 shows the combining of the input horizontal and vertical sync at block 445 (U00-3D—an Exclusive Or Gate) to form the composite sync signal required by some color monitors. The horizontal and vertical sync input signals are also buffered by block 446 and 447 (U003A and U003B) for color monitors requiring separate vertical and horizontal sync.

The output signals for a monochrome monitor appear at jumper connector 450 CONN3. The same type of drive circuit is used by the video and horizontal sync. The video signal for mono is buffered by block 451 U1 and inverted by block 452 (U002C). Block 452 drives transistor Q002 which is used to drive the G (green) video signal as a video input for the monochrome monitor. Resistor R007 provides current limiting and resistor R008 is used for pull up. The vertical sync signal is buffered twice by blocks 460 and 461 and is output in open collector configuration to connector 430 B27, the expansion chassis mother board and to connector 450 CONN3 without inversion.

SUMMARY OF GDIS HARDWARE FEATURES (1) Use of the actual target monitor that will be used in the production vehicle. Aspect ratio problems are eliminated.

(2) Flexibility: A monochrome and color monitor can be used independently or concurrently when jumpers J1 and J2 are installed on the video card as required and when a power card is installed for each monitor.

(3) The video card supports both analog and digital video monitor interfaces.

(4) Support is provided for color monitors with either composite or separate sync.

(5) The video interface will support various screen sizes (5 V or 13 V) and resolutions.

(6) With minor modification the video interface will support EL flat panels and color monitors with 64 color capability.

Figures 11, 12, 13:
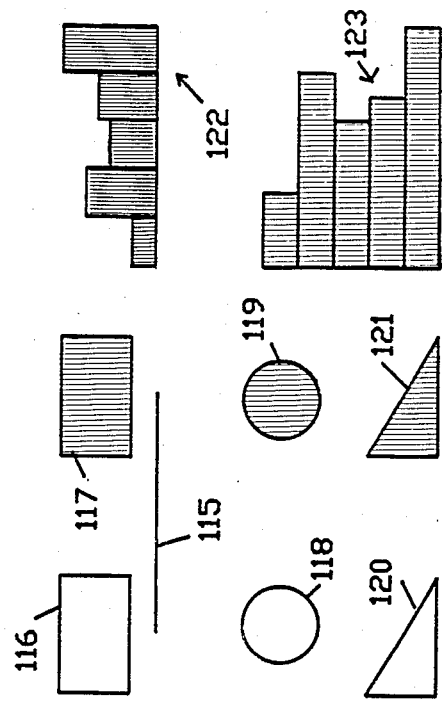
FIG. 11 is an overview of the GDIS work station software.
FIG. 12 is an overview of the functions of the vehicle screen generator program.
FIG. 13 illustrates typical graphic elements used by the GDIS system.

FIG. 11 is a listing of the GDIS workstation software. Software required includes the Vehicle Screen Generator program, the Post-Processor program and Host Communications support software.

FIG. 12 represents the functions of the Vehicle Screen Generator program. It allows the creation, editing and saving of screen designs which may include Graphic Elements, Icons and Symbols, Touch Screen functions, and Animation.

FIG. 13 represents typical Graphic Elements which may be used while designing screens with the GDIS. Graphic Elements include boxes 116, lines 115, filled boxes 117, circles 118, filled circles 119, triangles 120, filled triangles 121, horizontal bar graphs 123 and vertical bar graphs 122.

Figure 14:
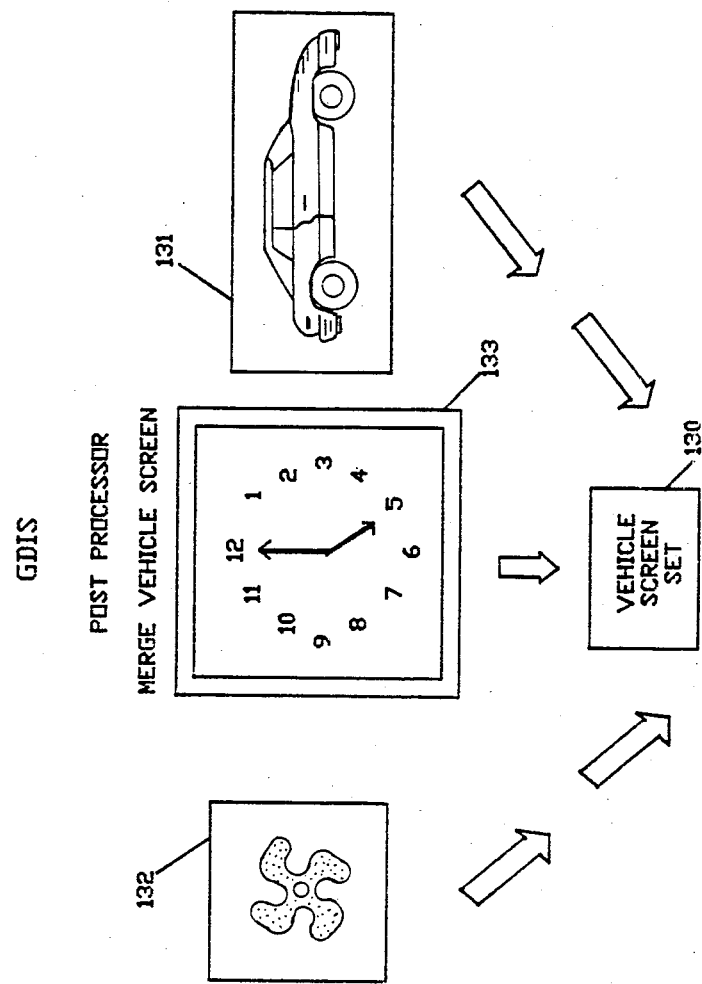
FIG. 14 illustrates the merging of several vehicle screens to create a vehicle screen set. This is accomplished via the Post-Processor and Link programs.

FIG. 14 illustrates the action of the Post-Processor program which creates screen source files which may be combined to create a vehicle screen set consisting of many different screens. Shown are a typical Icon fan 132, a Clock screen 133, and a vehicle drawing screen 131 which are combined to create vehicle Screen Set 130.

Figure 15:
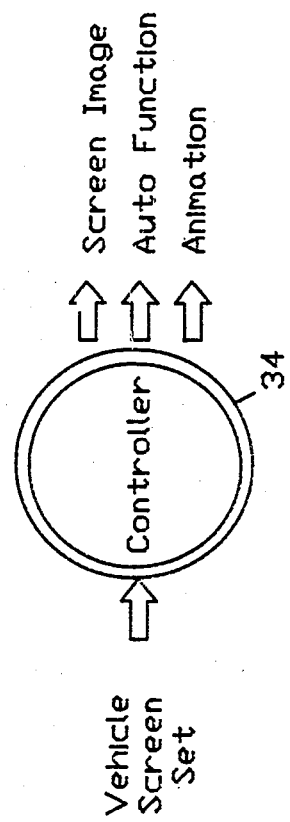
FIG. 15 represents the use of the vehicle screen set by the controller to generate screen images, automobile functions and animation.

FIG. 15 represents the use of the Vehicle Screen Set by the Display Controller 34, to create Screen images, Automobile functions and Animation, in the vehicle.

Figure 16:
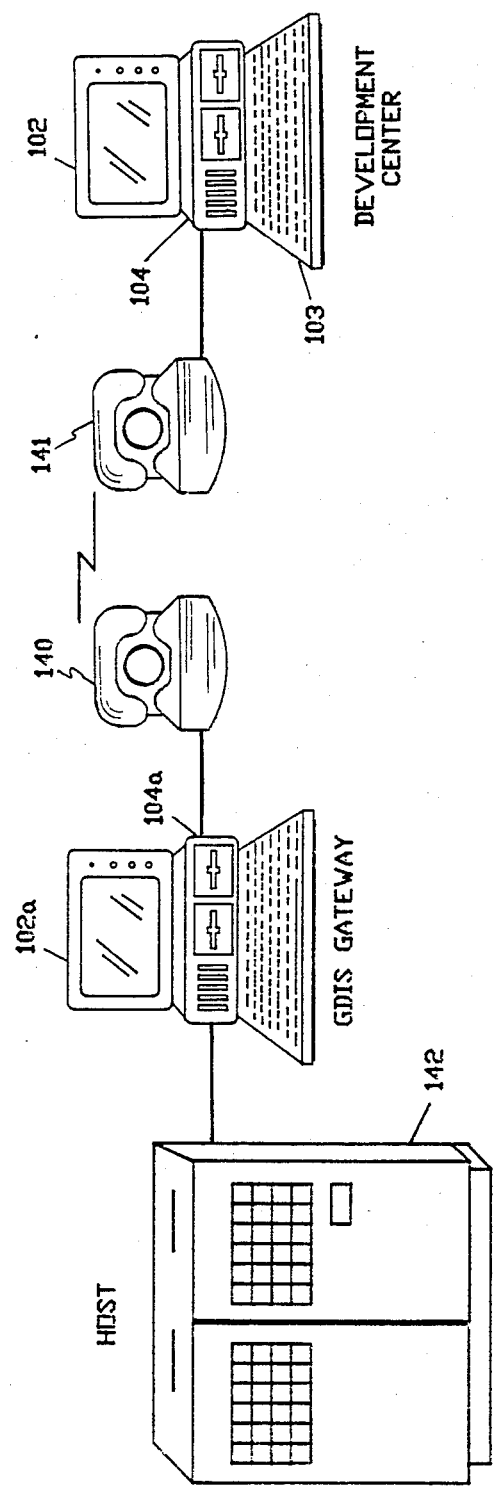
FIG. 16 is a high level diagram of communications of a host computer with the GDIS system.

FIG. 16 depicts the Host communication capability of the GDIS. Shown is a Host system 142, interconnected with a GDIS Gateway system that includes personal computer 104a, monitor 102a, and keyboard 103a. Also shown is a Remote GDIS system with personal computer 104, monitor 102 and keyboard 103. The Host 142 and GDIS Gateway system are directly connected. The telephones 140 and 141 on the GDIS Gateway system and Remote GDIS system respectively allow communication between the two GDIS systems.

FIG. 17 depicts the typical GDIS networking system with Network 150. The Network consists of a Host Processor 142 with direct attached GDIS workstations 100a–100c and Remote GDIS workstation 100.

FIG. 18 is a flow chart of the GDIS Control program. The program is automatically started at block 160, when the GDIS system is powered on. A logo screen is displayed and the vehicle display is initialized, block 161. Next the GDIS main menu is displayed, block 162. The user then enters a menu selection on the Keyboard block 163. If Option 1 is selected, block 165, then the Screen Edit menu is displayed, block 170. The user will then select from the Screen Edit menu block 171. The command is then processed by block 172, and the display of the Edit menu is then redrawn, block 170. This action repeats until block 171 menu item Save is selected. The Screen Definition file is then saved on the hard disk block 173 and the GDIS main menu is again displayed, block 162. If main menu Option 2 is selected, block 166, then an existing Screen Definition file is read into work space, block 174, and the Screen Edit menu is displayed, block 170, to allow the screen to be modified. If Option 3 is selected from the main GDIS menu, block 167, an existing screen file is deleted, block 175, and the main menu is again displayed. If Option 4 of the main menu is selected, block 168, then the Icon and Symbol Editor menu is displayed, block 176. The user then inputs Icon and Symbol editor commands, block 177, and they are processed one at a time by, block 178. The Icon Symbol Editor sub-menu is again displayed. This process repeats until the Exit command is entered. At this point the GDIS main menu is again displayed. If Option 5 is selected from the main menu block 169, then the Host Communication Sub-Menu is displayed, block 180. The user then inputs the Host Communication selection from the Keyboard, block 181, which is then performed by Host Communication sub-routines block 180. This process repeats until Exit is selected on the Host Communication menu. The GDIS menu is then displayed.

Figure 19:
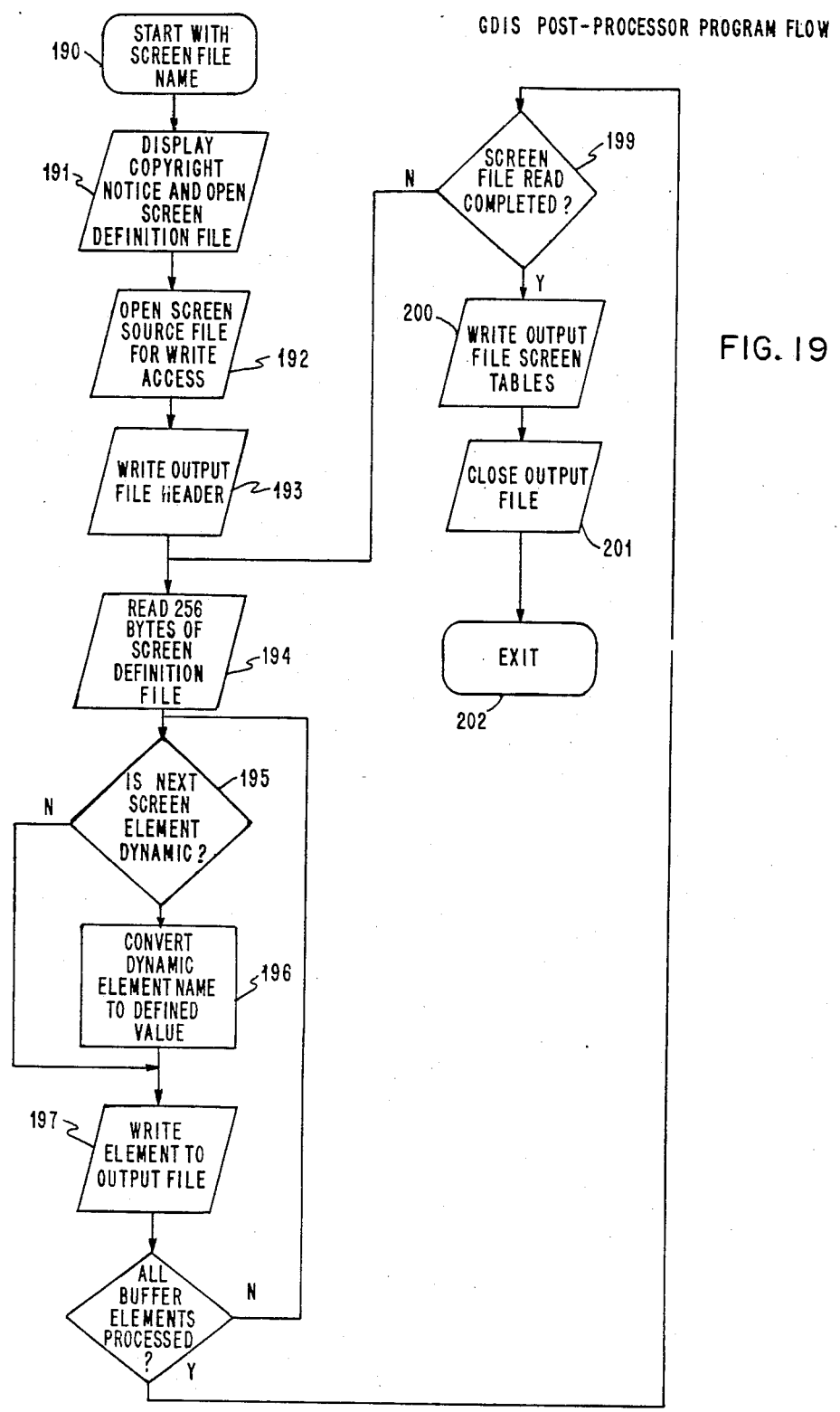
FIG. 19 is a flow chart of the GDIS Post-Processor program.

FIG. 19 is a flow chart of the GDIS Post-Processor program. The Post-Processor program is entered with a specified screen file name to be processed, block 190. The Post-Processor program then displays a copyright notice and opens the Screen Definition file which is to be processed, block 191. Next, the Screen Source file which is to be created is opened block 192. The screen header is then written to the output file, block 193. Two-hundred fifty-six bytes of the Screen Definition file are then read into a Buffer, block 194. Each element of the Screen Definition file is then processed one at a time. If the screen element is static the element needs no conversion, block 195. If the screen element is dynamic then the dynamic element name must be set to its defined value, block 196. The element, either static or dynamic is then written to output file, block 197. A check is then made if all of the elements in the Buffer have been processed, block 198. If they have not, then control passes back to process the next element, block 195. If all Buffer elements have been processed then control passes to block 199 where a test is made to determine if the complete screen file has been processed. If the screen file has been completely processed, the screen file tables are then written to the output file block 200. The output file is then closed, block 201, and the program exited, block 202.

FIG. 20 illustrates the Screen Data Structure produced by the GDIS Post-Processor program. It consists of a Global Header block 210, a Screen Header for each screen block 211, a Switch Screen Table block 212, a Statics Pointer Table block 214, Static Elements block 215, Icon and Symbol Data block 216, Dynamics Pointer Table block 217, Dynamic Elements block 218, Poll Table block 219, Touch Table block 220, Animation Pointer Table block 221, Animation Element 1 block 222, and Animation Element N block 223. These tables fully define all elements used to compose the Display screen. These tables are used by the Controller software to display and control the screen image.

Figure 21:
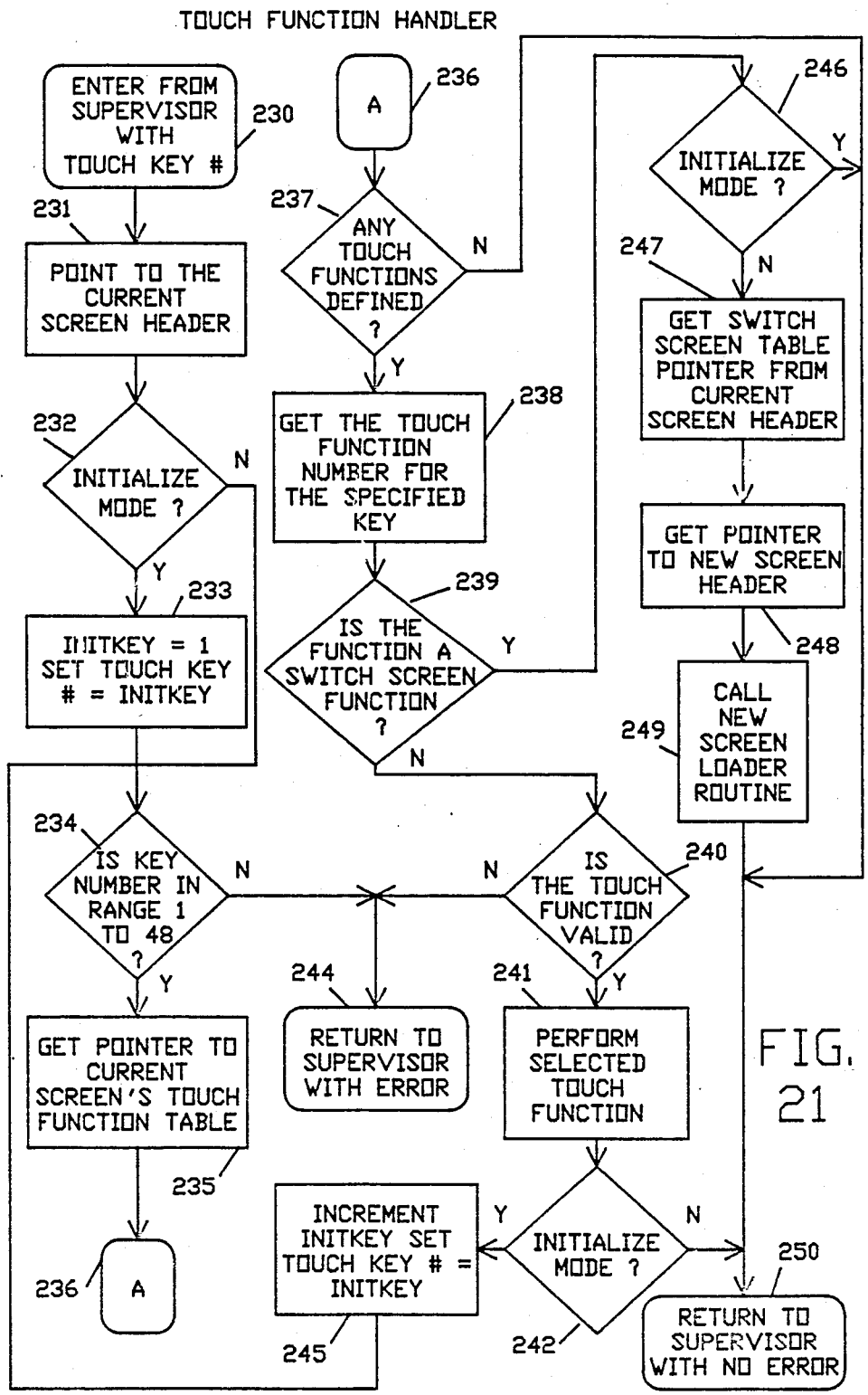
FIG. 21 is a flow chart of the Touch function handler in the controller software.

FIG. 21 is a flow chart of the Touch Function Handler of the Controller software. It is called from the Supervisor program with a Touch Key number, block 230. The current Screen Header is then pointed to, block 231. If the Initialize mode, block 232, the Initialize key number is set to 1 and the Touch key number is also set to 1, block 233. If not in Initialize mode then the number passed from the Supervisor is left untouched. Next the Key number is inspected to be in the range from 1 to 48, block 234. If the number is out of the valid range then an error is returned to the Supervisor, block 244, otherwise the pointer to the current screens Touch Function Table is obtained, block 235, from the screens header. Block 236 connector is then followed to block 237 where a determination is made if any Touch functions are defined on the screen, if none are defined then the Supervisor is returned to with no error. If functions are defined, the particular Touch function number for the specified key is obtained from the Touch Function Table, block 238. Next, it is determined if the function is a Switch Screen function, block 239. If not a Switch Screen function, a determination is made if the Touch Function is valid, block 240. If the function is valid it is performed, block 241, and if not in the Initialize mode, block 242, the Supervisor is returned to with no error, block 250. If the Touch Function is invalid, return is passed to the Supervisor with an error indicated without performing the Touch function. If a valid Touch function was selected in the Initialize mode then the Initialize Key number is incremented and the Touch Key number is set to that value. Control then passes to block 234. If the Touch function selected is a Switch Screen function block 239, control is passed to block 246. If Initialize mode in active then return is passed to the Supervisor with no error, otherwise the Switch Screen Table pointer is obtained from the current Screen Header, block 247, and the pointer to the new screen to be switched to is obtained, block 248. The new Screen Loader routine is then executed, block 249, and the Supervisor is then returned to with no error at block 250.

Figure 22:
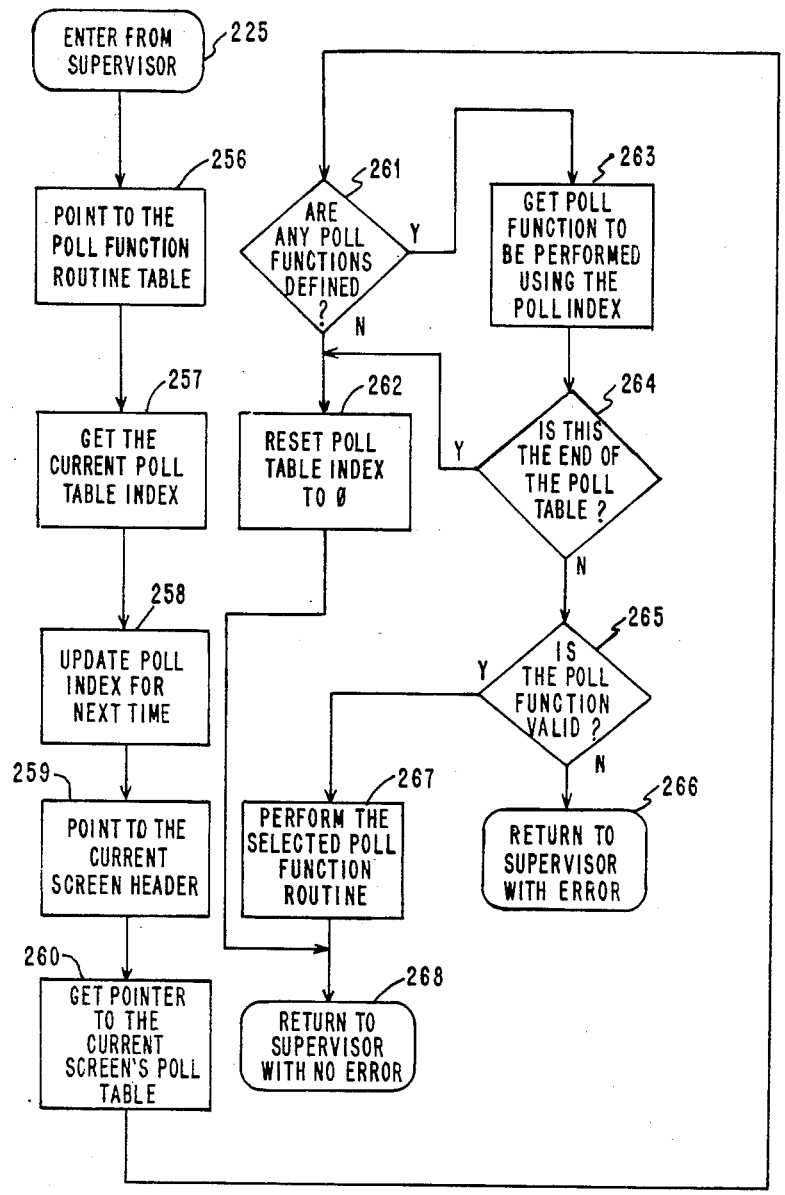
FIG. 22 is a flow chart of the Poll function handler of the controller software.

FIG. 22 is a flow chart of the Poll Function Handler. The Poll Function Handler is entered from the Supervisor block 255. First the Poll Function routine table is pointed to, block 256. The current Poll Table Index is obtained, block 257, and the Poll Table Index is updated for Next Time, block 258. The current Screen Header is then pointed to, block 259, the pointer to the Poll Table is then obtained from the Screen Header, block 260, and a determination is made if any Poll functions are defined on the current screen, block 261. If none are defined then the Poll Table Index is reset to zero, block 262, and the Supervisor is returned to with no error, block 268. If Poll Functions have been defined on the current screen then the Poll Function to be performed is obtained using the Poll Index, block 263. If this is the end of the Poll Table, block 264, then the Poll Table Index is also reset to zero, block 262, otherwise a determination is made if the Poll Function is valid, block 265. If not valid the Supervisor is returned to with an error indicated, block 266. If the Poll Function is valid, the Poll Function is performed, block 267 and return is passed to the Supervisor with no error, block 268.

Figure 23:
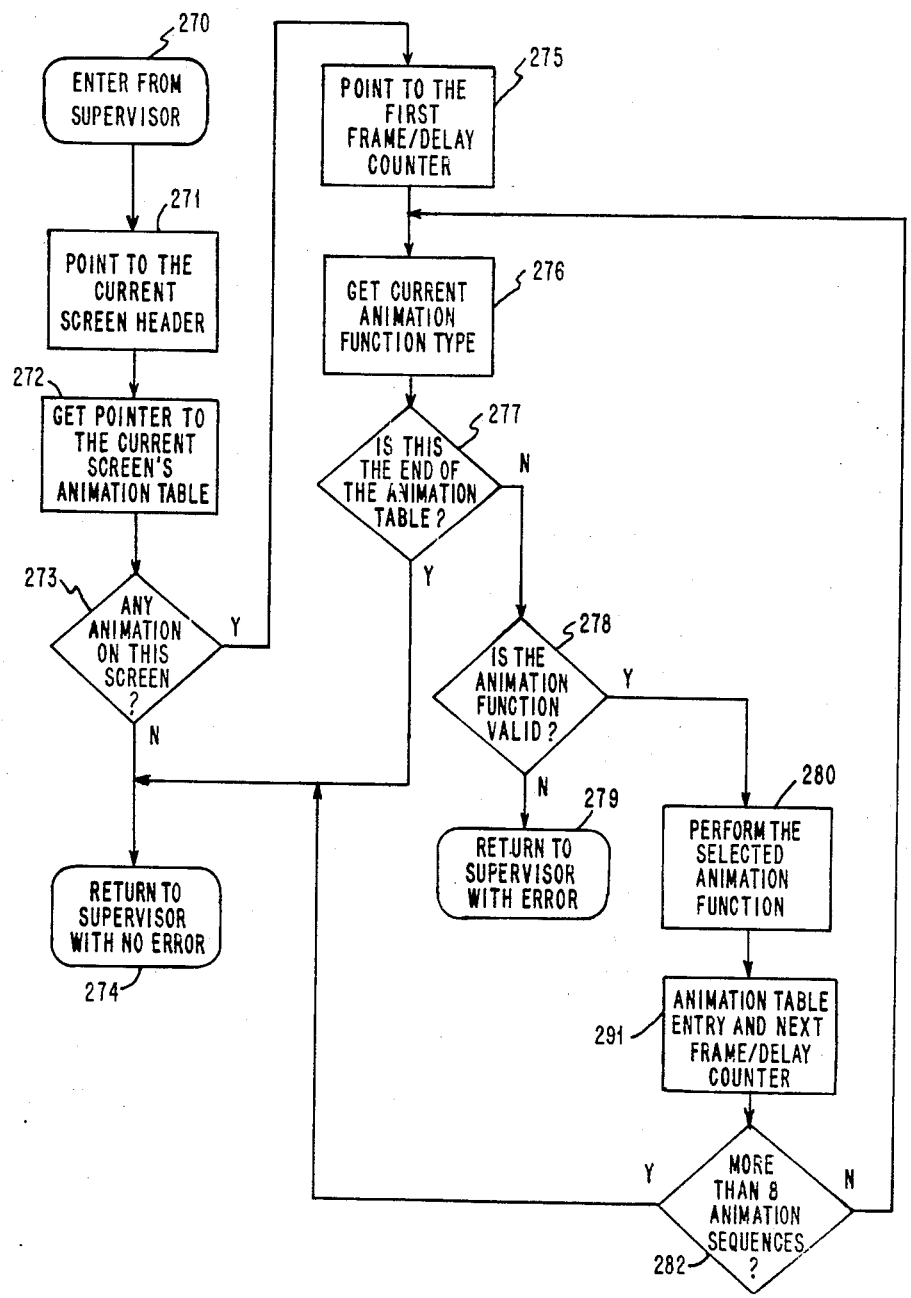
FIG. 23 is a flow chart of the Animation handler in the controller software.

FIG. 23 is a flow chart of the Animation Function Handler. The Animation Function Handler is entered from the Supervisor block 270. The current Screen Header is pointed to, block 271, the current screen's Animation Table Pointer is obtained from the Screen Header, block 272, and a determination is made if any animation is on the current screen, block 273. If no Animation is present then the Supervisor is returned to with no error, block 274, otherwise the first frame delay counter is pointed to, block 275. The current Animation Function type is obtained, block 276, and a determination is made if this is the end of the Animation Table, block 277. If the end of the table is encountered return to the Supervisor with no error occurs, block 274, otherwise a determination is made if the Animation Function is valid, block 278. If the Animation Function is invalid, return to the Supervisor with an error is performed, block 279, otherwise the Animation Function is valid and the function is performed, block 280. The next Animation Table entry and next frame delay counter are then pointed to, block 281. If more than eight Animation sequences exist on a single screen, block 282, then the remaining sequences are ignored, block 282, otherwise control is passed back to block 276 to get the next Animation Function Type.

FIG. 24 is a flow chart of the Screen Loader Routine. It is entered with a pointer to the Screen Header of the new Screen which is to be displayed. If the vehicle is in motion and the new screen is not allowed while the vehicle is in motion, then return occurs without displaying the new screen, blocks 286, 287 and 302. Or if the current operating mode is Accessory Mode and the screen cannot be displayed in Accessory Mode, then return occurs without displaying the new screen also, blocks 288 289 and 302. Otherwise the previous screen pointer, is set equal to the current screen pointer, block 290, the new screen header is pointed to, block 291, the new screen background color is obtained, block 292, the background Buffer is selected for drawing, block 293, the background Buffer is cleared to the background Color, block 294, the Static screen elements are then drawn, block 295, the Touch Functions are then initialized block 296, Poll Functions are initialized, block 297, and Animation Functions are initialized, block 298. Next, English or Metric Units are displayed depending upon the current mode, block 299. The new screen is then displayed from the background Buffer, block 300, and return is executed with the new screen now displayed, block 301.

While a preferred embodiment of the invention has been illustrated and described, it is to be understood that there is no intention to limit the invention to the precise construction herein disclosed and the right is reserved to all changes and modifications coming within the scope of the invention as defined in the appended claims.

| Appendix |
| --- |

```
AUTHOR John Doe
DATE 08-01-1986
REF 111
STYPE 2
FLAGS 2
BCOLOR 0
ECOUNT 55
FBOX    S, 125, 145, 183, 175, 14,NULL; 80, 69, 4, 59, 31
BOX     S, 100, 50, 215, 100, 2,NULL; 80, 69, 1, 116, 61
BOX     S, 8, 128, 57, 191, 14,NULL; 80, 68, 3, 50, 64
BOX     S, 99, 49, 216, 111, 2,NULL; 80, 69, 1, 118, 63
ICON    S, DARROW, 9, 167, 2, 0,NULL; 80, 68, 5
ICON    S, UPARROW, 9, 129, 2, 0,NULL; 80, 68, 4
LINE    S, 0, 120, 319, 120, 15,NULL;
TEXT    S, 20, 155, 15, 0, 2,'SET',NULL; 80, 69, 1
TEXT    S, 47, 152, 15, 0, 1,'o',NULL; 80, 69, 1
LINE    S, 0, 43, 319, 43, 15,NULL;
TEXT    S, 172, 147, 0, 14, 1,'o',NULL; 80, 69, 1
TEXT    S, 22, 74, 15, 0, 2, 'VOL',NULL; 80, 65, 3
BOX     S, 8, 49, 57, 111, 2,NULL; 80, 68, 3, 50, 63
ICON    S, UPARROW, 9, 50, 14, 0,NULL; 80, 68, 2
ICON    S, DARROW, 9, 87, 14, 0,NULL; 80, 68, 3
TEXT    S, 111, 180, 15, 0, 2,'INSIDE TEMP',NULL; 80, 69, 1
ICON    D, VETBUTT, 264, 148, 14, 0,HVACOFFI; 80, 69, 5
TEXT    D, 277, 154, 14, 0, 2,'PWR',HVACOFFI; 80, 69, 5
ICON    D, VETBUTR, 264, 148, 14, 0,HVACONI; 80, 69, 5
TEXT    D, 277, 154, 0, 14, 2,'PWR',HVACONI; 80, 69, 5
TEXT    D, 135, 147, 0, 14, 3,'75',STEMPF; 80, 69, 1
TEXT    D, 172, 158, 0, 14, 2,'C',TMPUNITC; 80, 69, 1
TEXT    D, 172, 158, 0, 14, 2,'F',TMPUNITF; 80, 69, 1
ICON    D, VETBUTT, 264, 68, 2, 0,RAD_OFFI; 80, 69, 3
TEXT    D, 277, 74, 2, 0, 2,'PWR',RAD_OFFI, 80, 69, 3
ICON    D, VETBUTR, 264, 68, 2, 0,RAD_ONI; 80, 69, 3
TEXT    D, 277, 74, 0, 2,'PWR',RAD_ONI; 80, 69, 3
TEXT    D, 118, 57, 0, 0, 3,'12345',FREQBLNK; 80, 69, 1
TEXT    D, 119, 88, 0, 0, 2,'FM',AMFMBLNK; 80, 69, 1
TEXT    D, 118, 57, 15, 0, 3,' 1420',STAT_AM; 80, 69, 1
```

Appendix -continued

```
TEXT   D, 119, 88, 15, 0, 2,'AM',AM_IND; 80, 69, 1
TEXT   D, 118, 57, 15, 0, 3'107.9',STAT_FM; 80, 69, 1
TEXT   D, 119, 88, 15, 0, 2,'FM',FM_IND; 80, 69, 1
TEXT   D, 149, 88, 0, 0, 2,'STEREO',STEROFFI; 80, 69, 1
TEXT   D, 149, 88, 15, 0, 2,'STEREO',STERONI; 80, 69, 1
TEXT   D, 110, 10, 11, 0, 3,'12:28',CLOCK; 80, 65, 1
TEXT   D, 195, 21, 10, 0, 2,'AM',CLOCKAM; 80, 65, 1
TEXT   D, 195, 21, 10, 0, 2,'PM',CLOCKPM; 80, 65, 1
TOUCH  D, 65, 2,VOLMUP,N
TOUCH  D, 65, 3,VOLMDN,N
TOUCH  D, 72, 11,VOLMUP,N
TOUCH  D, 72, 12,VOLMDN,N
TOUCH  D, 65, 4,SETTUP,N
TOUCH  D, 65, 5,SETTDN,N
TOUCH  D, 69, 3,RADONOF,N
TOUCH  D, 69, 5,HVACPWR,N
TOUCH  D, 72, 2,SWITCH,HVAC
TOUCH  D, 72, 5,SWITCH,RADIO
TOUCH  D, 72, 3,SWITCH,TRIP
TOUCH  D, 72, 4,SWITCH,INFO
TOUCH  D, 72, 6,SWITCH,MENU
TOUCH  D, 65, 1,SWITCH,CORVETE
TOUCH  D, 72, 8,RETURN,N
TOUCH  D, 69, 2,RADONOF,N
TOUCH  D, 69, 4,HVACPWR,N
```

A complete description of the Graphics Design Language is shown below:

Parameters enclosed in square brackets [,] are optional.

GDI LANGUAGE

LINE - USED TO DRAW A STRAIGHT LINE BETWEEN TWO POINTS.

SYNTAX:
OPCODE PARAMETERS
LINE MODE,X1,Y1,X2,Y2,COLOR[,UNAME]
X1 - HORIZONTAL COORDINATE
    A DECIMAL VALUE IN THE RANGE OF 0-319
Y1 - VERTICAL COORDINATE
    A DECIMAL VALUE IN THE RANGE OF 0-199
X2 - HORIZONTAL COORDINATE
    A DECIMAL VALUE IN THE RANGE OF 0-319
Y2 - VERTICAL COORDINATE
    A DECIMAL VALUE IN THE RANGE OF 0-199
COLOR - A DECIMAL VALUE IN THE RANGE OF 0-15
MODE - S OR D (S = DEFAULT)
    S - STATIC - DISPLAY ONLY
    D - DYNAMIC - ASSOCIATE WITH CONTROLLER FUNCTION
UNAME - NAME OF PREDEFINED CONTROLLER FUNCTION (DYNAMIC ONLY)

BOX - USED TO DRAW A BOX (OUTLINED).

SYNTAX:
OPCODE PARAMETERS
BOX MODE,X1,Y1,X2,Y2,COLOR[,UNAME]
X1 - HORIZONTAL COORDINATE OF BOX ORIGIN
    A DECIMAL VALUE IN THE RANGE OF 0-319
Y1 - VERTICAL COORDINATE OF BOX ORIGIN
    A DECIMAL VALUE IN THE RANGE OF 0-199
X2 - HORIZONTAL COORDINATE OF BOX END
    A DECIMAL VALUE IN THE RANGE OF 0-319
Y2 - VERTICAL COORDINATE OF BOX END
    A DECIMAL VALUE IN THE RANGE OF 0-199
COLOR - COLOR OF BOX OUTLINE
    - A DECIMAL VALUE IN THE RANGE OF 0-15
MODE - S OR D (S = DEFAULT)
    S - STATIC - DISPLAY ONLY
    D - DYNAMIC - ASSOCIATE WITH CONTROLLER FUNCTION
UNAME - NAME OF PREDEFINED CONTROLLER

GDI LANGUAGE -continued
FUNCTION (DYNAMIC ONLY)

CIRCLE - USED TO DRAW A CIRCLE OUTLINE.

SYNTAX:
OPCODE PARAMETERS
CIRCLE MODE,X,Y,R,COLOR[,UNAME]
X - HORIZONTAL COORDINATE OF CENTER
    A DECIMAL VALUE IN THE RANGE OF 0-319
Y - VERTICAL COORDINATE OF CENTER
    A DECIMAL VALUE IN THE RANGE OF 0-199
R - LENGTH OF RADIUS IN THE X DIRECTION
    A DECIMAL VALUE IN THE RANGE OF 0-100
    (IN PIXELS)
COLOR - COLOR OF CIRCLE OUTLINE
    - A DECIMAL VALUE IN THE RANGE OF 0-15
MODE - S OR D (S = DEFAULT)
    S - STATIC - DISPLAY ONLY
    D - DYNAMIC - ASSOCIATE WITH CONTROLLER FUNCTION
UNAME - NAME OF PREDEFINED CONTROLLER FUNCTION (DYNAMIC ONLY)

FBOX - USED TO DRAW A FILLED BOX.

SYNTAX:
OPCODE PARAMETERS
FBOX MODE,X1,Y1,X2,Y2,COLOR[,UNAME]
X1 - HORIZONTAL COORDINATE OF FBOX ORIGIN
    A DECIMAL VALUE IN THE RANGE OF 0-319
Y1 - VERTICAL COORDINATE OF FBOX ORIGIN
    A DECIMAL VALUE IN THE RANGE OF 0-199
X2 - HORIZONTAL COORDINATE OF FBOX END
    A DECIMAL VALUE IN THE RANGE OF 0-319
Y2 - VERTICAL COORDINATE OF FBOX END
    A DECIMAL VALUE IN THE RANGE OF 0-199
COLOR - FOREGROUND COLOR OF FILLED BOX
    - A DECIMAL VALUE IN THE RANGE OF 0-15
MODE - S OR D (S = DEFAULT)
    S - STATIC - DISPLAY ONLY
    D - DYNAMIC - ASSOCIATE WITH CONTROLLER FUNCTION
UNAME - NAME OF PREDEFINED CONTROLLER FUNCTION

HBAR - USED TO DRAW A BAR GRAPH IN THE HORIZONTAL DIRECTION

SYNTAX:
OPCODE PARAMETERS
HBAR MODE,X1,Y1,X2,Y2,COLOR[,UNAME]
X1 - HORIZONTAL COORDINATE OF HBAR ORIGIN
    A DECIMAL VALUE IN THE RANGE OF 0-319
Y1 - VERTICAL COORDINATE OF HBAR ORIGIN
    A DECIMAL VALUE IN THE RANGE OF 0-199
X2 - HORIZONTAL COORDINATE OF HBAR END
    A DECIMAL VALUE IN THE RANGE OF 0-319
Y2 - VERTICAL COORDINATE OF HBAR END
    A DECIMAL VALUE IN THE RANGE OF 0-199
COLOR - FOREGROUND COLOR OF HORIZONTAL
    BAR GRAPH
    - A DECIMAL VALUE IN THE RANGE OF 0-15
MODE - D - DYNAMIC - ASSOCIATE WITH CONTROLLER FUNCTION
UNAME - NAME OF PREDEFINED CONTROLLER FUNCTION

VBAR - USED TO DRAW A BAR GRAPH IN THE VERTICAL DIRECTION

SYNTAX:
OPCODE PARAMETERS
VBAR MODE,X1,Y1,X2,Y2,COLOR[,UNAME]
X1 - HORIZONTAL COORDINATE OF VBAR ORIGIN
    A DECIMAL VALUE IN THE RANGE OF 0-319

GDI LANGUAGE (continued)

Y1 - VERTICAL COORDINATE OF VBAR ORIGIN
   A DECIMAL VALUE IN THE RANGE OF 0-199
X2 - HORIZONTAL COORDINATE OF VBAR END
   A DECIMAL VALUE IN THE RANGE OF 0-319
Y2 - VERTICAL COORDINATE OF VBAR END
   A DECIMAL VALUE IN THE RANGE OF 0-199
COLOR - FOREGROUND COLOR OF VERTICAL
   BAR GRAPH
   - A DECIMAL VALUE IN THE RANGE OF 0-15
MODE - D - DYNAMIC - ASSOCIATE WITH CONTROLLER
   FUNCTION
UNAME - NAME OF PREDEFINED CONTROLLER
   FUNCTION

TRIANGLE - USED TO DRAW A FILLED TRIANGLE.

SYNTAX:
OPCODE PARAMETERS
TRIANGLE MODE,X1,Y1,X2,Y2,X3,Y3,COLOR[,UNAME]
X1 - HORIZONTAL COORDINATE OF TRIANGLE VERTEX 1
   A DECIMAL VALUE IN THE RANGE OF 0-319
Y1 - HORIZONTAL COORDINATE OF TRIANGLE VERTEX 1
   A DECIMAL VALUE IN THE RANGE OF 0-199
X2 - HORIZONTAL COORDINATE OF TRIANGLE VERTEX 2
   A DECIMAL VALUE IN THE RANGE OF 0-319
Y1 - HORIZONTAL COORDINATE OF TRIANGLE VERTEX 2
   A DECIMAL VALUE IN THE RANGE OF 0-199
X3 - HORIZONTAL COORDINATE OF TRIANGLE VERTEX 3
   A DECIMAL VALUE IN THE RANGE OF 0-319
X3 - HORIZONTAL COORDINATE OF TRIANGLE VERTEX 3
   (LOWER RIGHT CORNER)
   A DECIMAL VALUE IN THE RANGE OF 0-199
COLOR - FOREGROUND COLOR OF FILLED TRIANGLE
   - A DECIMAL VALUE IN THE RANGE OF 0-15
MODE - S OR D (S = DEFAULT)
   S - STATIC - DISPLAY ONLY
   D - DYNAMIC - ASSOCIATE WITH CONTROLLER
      FUNCTION
UNAME - NAME OF PREDEFINED CONTROLLER
   FUNCTION (DYNAMIC ONLY)

FCIRCLE - USED TO DRAW A FILLED CIRCLE.

SYNTAX:
OPCODE PARAMETERS
FCIRCLE MODE,X,Y,R,COLOR[,UNAME]
X - HORIZONTAL COORDINATE OF CENTER
   A DECIMAL VALUE IN THE RANGE OF 0-319
Y - HORIZONTAL COORDINATE OF CENTER
   A DECIMAL VALUE IN THE RANGE OF 0-199
R - LENGTH OF RADIUS IN THE X DIRECTION
   A DECIMAL VALUE IN THE RANGE OF 0-100
   (IN PIXELS)
COLOR - FOREGROUND COLOR OF FILLED CIRCLE
   - A DECIMAL VALUE IN THE RANGE OF 0-15
MODE - S OR D (S = DEFAULT)
   S - STATIC - DISPLAY ONLY
   D - DYNAMIC - ASSOCIATE WITH CONTROLLER
      FUNCTION
UNAME - NAME OF PREDEFINED CONTROLLER
   FUNCTION

TEXT - ALPHANUMERIC DATA IMBEDDED IN SCREEN IMAGE.

SYNTAX:
OPCODE PARAMETERS
TEXT MODE,FONT,X,Y,BCOLOR,FCOLOR,"TEXT"
[,UNAME]
FONT - A DECIMAL VALUE SPECIFYING CHARACTER
   STYLE IN THE RANGE 1-3
X - HORIZONTAL COORDINATE OF FIRST CHARACTER
   (UPPER LEFT CORNER OF FIRST CHARACTER)
   A DECIMAL VALUE IN THE RANGE OF 0-319
Y - VERTICAL COORDINATE OF FIRST CHARACTER
   (UPPER) LEFT CORNER OF FIRST CHARACTER)
   A DECIMAL VALUE IN THE RANGE OF 0-199
"TEXT" - TEXT "AS IS"
MAXIMUM NUMBER OF CHARACTERS DEPENDS ON
THE FONT
   FONT 1 = 40 CHARACTERS
   FONT 2 = 40 CHARACTERS
   FONT 3 = 20 CHARACTERS
MODE - S OR D (S = DEFAULT)
   S - STATIC - DISPLAY ONLY
   D - DYNAMIC - ASSOCIATE WITH CONTROLLER
      FUNCTION
BCOLOR - BACKGROUND COLOR OF TEXT
   - A DECIMAL VALUE IN THE RANGE OF 0-15
FCOLOR - FOREGROUND COLOR OF TEXT
   A DECIMAL VALUE IN THE RANGE OF 0-15
UNAME - NAME OF PREDEFINED CONTROLLER
   FUNCTION (DYNAMIC ONLY)

ICON - USED TO IMBED A PREDEFINED SYMBOL (48×24 PIXELS) AS A UNIT WITHIN A SCREEN IMAGE.

SYNTAX:
OPCODE PARAMETERS
ICON MODE,NAME,X,Y,BCOLOR,FCOLOR[,UNAME]
NAME - THE MEMBER NAME OF AN EXISTING ICON
   WHICH RESIDES IN THE CURRENT
   DIRECTORY
   (1 TO 7 CHARACTERS)
   DOS FILE EXTENSION IS ALWAYS ".IMO"
X - HORIZONTAL COORDINATE FOR ICON PLACEMENT
   (UPPER LEFT CORNER)
   A DECIMAL VALUE IN THE RANGE OF 0-319
Y - VERTICAL COORDINATE FOR ICON PLACEMENT
   (UPPER LEFT CORNER)
   A DEMICAL VALUE IN THE RANGE OF 0-199
BCOLOR - BACKGROUND COLOR OF ICON
   - A DECIMAL VALUE IN THE RANGE OF 0-15
FCOLOR - FOREGROUND COLOR OF ICON
   - A DECIMAL VALUE IN THE RANGE OF 0-15
MODE - S OR D (S = DEFAULT)
   S - STATIC - DISPLAY ONLY
   D - DYNAMIC - ASSOCIATE WITH
      CONTROLLER FUNCTION
UNAME - NAME OF PREDEFINED CONTROLLER
   FUNCTION (DYNAMIC ONLY)

SYMBOL - USED TO IMBED A PREDEFINED SYMBOL (16×16 PIXELS) AS A UNIT WITHIN A SCREEN IMAGE.

SYNTAX:
OPCODE PARAMETERS
SYMBOL MODE,NAME,X,Y,BCOLOR,FCOLOR[,UNAME]
NAME - THE MEMBER NAME OF AN EXISTING SYMBOL
   WHICH RESIDES IN THE CURRENT
   DIRECTORY DOS FILE EXTENSION IS
   ALWAYS "SMO"
X - HORIZONTAL COORDINATE FOR SYMBOL
   PLACEMENT (UPPER LEFT CORNER)
   A DECIMAL VALUE IN THE RANGE OF 0-319
Y - VERTICAL COORDINATE FOR SYMBOL
   PLACEMENT (UPPER LEFT CORNER)
   A DEMICAL VALUE IN THE RANGE OF 0-199
BCOLOR - BACKGROUND COLOR OF SYMBOL
   - A DECIMAL VALUE IN THE RANGE OF 0-15
FCOLOR - FOREGROUND COLOR OF SYMBOL
   - A DECIMAL VALUE IN THE RANGE OF 0-15
MODE - S OR D (S = DEFAULT)
   S - STATIC - DISPLAY ONLY
   D - DYNAMIC - ASSOCIATE WITH
      CONTROLLER FUNCTION
UNAME - NAME OF PREDEFINED CONTROLLER
   FUNCTION (DYNAMIC ONLY)

-continued
GDI LANGUAGE

| IANIMATE | USED TO CREATE SIMPLE ANIMATION USING ICONS (TIME CYCLE DISPLAY OF SERIES OF ICONS) THE CYCLE TIME CONSTANT IS SPECIFIED BY CODE IN THE CONTROLLER USING THE DELAY PARAMETER) ICONS IN AN ANIMATION SEQUENCE OVERLAY EACH OTHER. AN ANIMATION SEQUENCE OF TWO TO EIGHT ICONS IS SUPPORTED. HOWEVER, ICONS AND SYMBOLS CAN NOT BE MIXED IN AN ANIMATION SEQUENCE. |

SYNTAX:
OPCODE PARAMETERS
IANIMATE MODE,NAME[1], . . . ,NAME[8],DELAY,X,Y,
    BCOLOR,FCOLOR[,UNAME]
NAME - THE NAME OF AN EXISTING ICON
    WHICH RESIDES IN THE CURRENT
    DIRECTORY
X - HORIZONTAL COORDINATE FOR ICONS
    PLACEMENT (UPPER LEFT CORNER)
    A DECIMAL VALUE IN THE RANGE OF 0-319
Y - VERTICAL COORDINATE FOR ICONS
    PLACEMENT (UPPER LEFT CORNER)
    A DEMICAL VALUE IN THE RANGE OF 0-199
DELAY - A VALUE FROM 0-32767 USED FOR
    ANIMATION DISPLAY DELAY
    3 = 100 milliseconds
    15 = 500 milliseconds
    30 = 1 second
BCOLOR - BACKGROUND COLOR OF ANIMATION
    SEQUENCE
    - A DECIMAL VALUE IN THE RANGE OF 0-15
FCOLOR - FOREGROUND COLOR OF ANIMATION
    SEQUENCE
    - A DECIMAL VALUE IN THE RANGE OF 0-15
MODE - S OR D (S = DEFAULT)
    S - STATIC - DISPLAY ONLY
    D - DYNAMIC - ASSOCIATE WITH
    CONTROLLER FUNCTION
UNAME - NAME OF PREDEFINED CONTROLLER
    FUNCTION (DYNAMIC ONLY)

| SANIMATE | USED TO CREATE SIMPLE ANIMATION USING SYMBOLS (TIME CYCLE DISPLAY OF SERIES OF SYMBOLS) THE CYCLE TIME CONSTANT IS SPECIFIED BY CODE IN THE CONTROLLER USING THE DELAY PARAMETER) SYMBOLS IN AN ANIMATION SEQUENCE OVERLAY EACH OTHER. AN ANIMATION SEQUENCE OF TWO TO EIGHT SYMBOLS IS SUPPORTED. HOWEVER, ICONS AND SYMBOLS CAN NOT BE MIXED IN AN ANIMATION SEQUENCE. |

SYNTAX:
OPCODE PARAMETERS
SANIMATE MODE,NAME[1], . . . ,NAME[8],DELAY,X,Y,
    BCOLOR,FCOLOR [,UNAME]
NAME - THE NAME OF AN EXISTING SYMBOL WHICH
    RESIDES IN THE CURRENT DIRECTORY
X - HORIZONTAL COORDINATE FOR SYMBOLS
    PLACEMENT (UPPER LEFT CORNER)
    A DECIMAL VALUE IN THE RANGE OF 0-319
Y - VERTICAL COORDINATE FOR SYMBOLS
    PLACEMENT (UPPER LEFT CORNER)
    A DECIMAL VALUE IN THE RANGE OF 0-199
DELAY - A VALUE FROM 0-32767 USED FOR
    ANIMATION DISPLAY DELAY
    3 = 100 milliseconds
    15 = 500 milliseconds
    30 = 1 second
BCOLOR - BACKGROUND COLOR OF ANIMATION
    SEQUENCE
    - A DECIMAL VALUE IN THE RANGE OF 0 - 15
FCOLOR - FOREGROUND COLOR OF ANIMATION
    SEQUENCE -continued
GDI LANGUAGE

- A DECIMAL VALUE IN THE RANGE OF 0 - 15
MODE - S OR D (S = DEFAULT)
    S - STATIC - DISPLAY ONLY
    D - DYNAMIC - ASSOCIATE WITH
    CONTROLLER FUNCTION
UNAME - NAME OF PREDEFINED CONTROLLER
    FUNCTION (DYNAMIC ONLY)

| TOUCH | USED TO ASSIGN A CONTROLLER FUNCTION TO A TOUCH KEY |

SYNTAX:
OPCODE PARAMETERS
TOUCH MODE,X,Y,UNAME,[SCREEN]
X - TOUCH GRID HORIZONTAL COORDINATE
    A CHARACTER IN THE RANGE OF 65 TO 69, OR 72
    FOR TOUCH GRID LOCATIONS A-E OR H
    RESPECTIVELY. TOUCH LOCATIONS A-E ADDRESS
    THE DISPLAY TOUCH GRIDS. TOUCH LOCATION
    H ADDRESSES A HARD SWITCH.
Y - TOUCH GRID VERTICAL COORDINATE
    A DECIMAL VALUE IN THE RANGE OF 1-5 IF X IN
    RANGE (65-69)
    OR
    A DECIMAL VALUE IN THE RANGE OF 1-23 IF
    X = 72 (H)
UNAME - THE NAME OF A PREDEFINED
    CONTROLLER FUNCTION (PREDEFINED
    FUNCTIONS ARE IMPLEMENTATION
    DEPENDENT)
SCREEN - SCREEN NAME IF UNAME = "SWITCH"
MODE - D - A TOUCH STATEMENT IS DYNAMIC
    BY DEFINITION

| DATE | - DATE OF SCREEN CREATION |

SYNTAX:
OPCODE PARAMETERS
DATE DATE-STRING
DATE-STRING - THE DATE OF SCREEN CREATION (OR
    LAST UPDATE TO THE SCREEN)

| BCOLOR | - BACKGROUND COLOR OF SCREEN |

SYNTAX:
OPCODE PARAMETERS
BCOLOR COLOR
COLOR - BACKGROUND COLOR OF SCREEN
    - A DECIMAL VALUE IN THE RANGE OF 0-15

| ECOUNT | - ELEMENT COUNT |

SYNTAX:
OPCODE PARAMETERS
ECOUNT NUMBER
NUMBER - NUMBER OF ELEMENTS IN SCREEN
    - A DECIMAL VALUE IN THE RANGE OF 1-N,
    WHERE IS THE
    TOTAL NUMBER OF GRAPHIC AND
    TOUCH ELEMENTS IN A SCREEN

| REF | - REFERENCE NUMBER |

SYNTAX:
OPCODE PARAMETERS
REF REFERENCE-STRING
REFERENCE-STRING - A STRING OF CHARACTERS TO
    DESCRIBE THE SCREEN
    (USUALLY A MANUAL PAGE
    NUMBER)

-continued
GDI LANGUAGE

AUTHOR - AUTHOR'S IDENTIFICATION

SYNTAX:
OPCODE PARAMETERS
AUTHOR AUTHOR-ID
AUTHOR ID - AUTHOR'S IDENTIFICATION
    - A STRING OF CHARACTERS

FLAGS - SCREEN MODE FLAGS

SYNTAX:
OPCODE PARAMETERS
FLAGS S-FLAGS
S-FLAGS - SCREEN MODE FLAGS
0 = SCREEN CAN BE DISPLAYED ANYTIME
1 = SCREEN CANNOT BE DISPLAYED WHILE THE VEHICLE IS IN MOTION
2 = SCREEN CANNOT BE DISPLAYED WHILE IN IGNITION ACCESSORY MODES
3 = SCREEN CANNOT BE DISPLAYED WHILE THE VEHICLE IS IN MOTION OR WHILE IN IGNITION ACCESSORY MODES

STYPE - SCREEN TYPE

SYNTAX:
OPCODE PARAMETERS
STYPE S-TYPE
S-TYPE - SCREEN TYPE
A DECIMAL NUMBER IN THE RANGE 0-9
0 = NORMAL
1 = LOGO
2 = SUMMARY
3 = MAIN RADIO
4 = CHECK SERVICE
5 = CHECK EVENT
6 = IMMEDIATE MESSAGE
7 = DIAGNOSTIC GRAPHICS
8 = DIAGNOSTIC TEXT
9 = SYSTEMS OK

We claim:

1. Graphics Development Instrument System (GDIS) for designing and displaying screens for display systems having a CRT display unit, associated touch matrix and discrete switches, interconnected microprocessor control means, and adapted for displaying sequences of base panels and sub-panels, static and dynamic elements, and animated elements, comprising:
   (1) a monitor for displaying screens;
   (2) computer means including storage and display means;
   (3) vehicle Screen Generator program means operable to selectively generate data for monochrome or color screens to enable editing and to store the data, said data being representative of graphic elements, symbols, icons, animation, and touch switch function assignments, for individual screens; and
   (4) Post-processor program means for combining a plurality of screens generated by said Screen Generator program means to create at least one screen set representative of a sequence of screen panels for said display system, and for creating screen tables which define all elements used to compose the display screens.

2. The system of claim 1 further comprising
   a host system;
   a gateway processor system,
   communications links; and
   means interconnecting said GDIS system to said gateway processor and said host processor via said communications links for remote automated generation of screens and screen sets.

3. The system of claim 1 wherein said GDIS includes a control program having program modules for performing the functions: Main Menu, Screen Edit menu, Icon/Symbol Edit menu and Host communications.

4. The system of claim 1 wherein said Post-Processor program means converts screen dynamic names into appropriate values, adds table definitions and outputs the assembled information to create the screen tables.

5. The system of claim 1 further comprising: (5) a video control means, said video control means being selectively operable to support (a) monochrome and color video monitors and (b) analog and digital video monitor interfaces and (c) composite and separate synchronization for color monitors and (d) a variety of monitor screen sizes;
   (6) means interconnecting said video control means to selected types of video monitors desired for GDIS operation;
   (7) enhanced graphics adapter means for supplying video signals to said video control means responsive to signals from said computer means; and
   (8) a power card for supplying power to each monitor connected in said GDIS system.

* * * * *